（12） United States Patent
Zhao

(10) Patent No.: US 11,696,089 B2
(45) Date of Patent: *Jul. 4, 2023

(54) SYSTEM AND METHOD FOR ENERGY EFFICIENT GEOFENCING IMPLEMENTATION AND MANAGEMENT

(71) Applicant: Comcast Cable Communications, LLC, Philadelphia, PA (US)

(72) Inventor: Zhen Zhao, Berwyn, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/871,190

(22) Filed: Jul. 22, 2022

(65) Prior Publication Data

US 2023/0091274 A1 Mar. 23, 2023

Related U.S. Application Data

(63) Continuation of application No. 16/212,774, filed on Dec. 7, 2018, now Pat. No. 11,432,101, which is a
(Continued)

(51) Int. Cl.
*H04W 4/021* (2018.01)
*H04L 43/10* (2022.01)

(52) U.S. Cl.
CPC ............. *H04W 4/021* (2013.01); *H04L 43/10* (2013.01)

(58) Field of Classification Search
CPC ..... H04W 4/021; H04W 88/06; H04W 88/08; H04W 4/02; H04W 12/63; H04W 24/00; H04W 4/027; H04W 64/00; H04W 4/00; H04W 4/028; H04W 4/023; H04W 4/025; H04W 28/0226; H04W 36/0066; H04W 4/003; H04W 4/04; H04W 4/14; H04W 4/22; H04W 8/18; H04W 64/006; H04W 64/003; H04W 76/10; H04W 28/0231; H04W 28/0289; H04W 40/02; H04W 4/029; H04W 4/38; H04W 52/223; H04W 40/20; H04W 36/32; H04W 36/0083; H04W 36/0061; H04W 36/36;
(Continued)

(56) References Cited

U.S. PATENT DOCUMENTS 5,572,221 A 11/1996 Marlevi et al.
5,799,256 A 8/1998 Pombo et al.
(Continued)

*Primary Examiner* — Nimesh Patel
(74) *Attorney, Agent, or Firm* — Banner & Witcoff, Ltd.

(57) ABSTRACT

A determination is made as to whether a computing device is located inside a first geofence of a geofence environment. A first location determination mode available to the computing device for determining a location of the computing device is identified. A second location determination mode available to the computing device for determining a location of the computing device is identified, wherein the second location determination mode consumes less power than the first location determination mode. A selection is made between the first location determination mode and the second location determination mode, based on the determination of whether the computing device is located inside the first geofence. A next location of the computing device is determined using the selected location determination mode, a next location of the computing device.

44 Claims, 13 Drawing Sheets

Related U.S. Application Data continuation of application No. 15/708,288, filed on Sep. 19, 2017, now Pat. No. 10,187,745.

(58) Field of Classification Search
CPC . H04W 68/00; H04W 52/0206; H04W 48/12; H04W 36/22; H04W 52/0225; H04W 36/30; H04W 52/0212; H04W 52/0254; H04W 52/40; H04W 72/1289; H04W 16/18; H04W 48/04; H04W 52/0277; H04W 60/04; H04W 88/16; H04W 40/12; H04W 40/18; H04L 43/10; H04L 63/102; H04L 2209/80; H04L 63/0492; H04L 63/108; H04L 63/10; H04L 63/0876; H04L 43/0817; H04L 67/306; H04L 1/1845; H04L 12/6418; H04L 65/1016; H04L 63/20; H04L 63/0281; H04L 63/105; H04L 67/125; H04L 67/18; H04L 12/2825; H04L 67/12; H04L 67/10; H04L 67/42; H04L 67/303; H04L 41/0813; H04L 41/0823; H04L 12/189; H04L 61/609; H04L 63/0853; H04L 67/22; H04L 9/083; H04L 69/329; H04L 12/2854; H04L 41/5009; H04L 43/106; H04L 45/00; H04L 47/805; H04L 47/824; H04L 51/20; H04L 67/327; H04L 43/08; H04L 12/1845; H04L 67/1021; G06F 11/30; G06F 16/335; G06F 16/245; G06F 16/9535; G06F 3/0484; Y02D 30/70; Y02D 70/00; Y02D 70/164; Y02D 70/142; Y02D 70/1222; Y02D 70/1224; Y02D 70/24; Y02D 70/144; Y02D 70/26; Y02D 70/10; Y02D 70/14; Y02D 70/20; H04H 20/08; H04H 60/46; H04H 60/51; H04H 20/71; H04H 20/61; H04H 20/67; H04H 20/72; H04H 60/50; G06Q 30/0201; G06Q 30/0241; G06Q 50/01; H04M 3/5141; H04M 3/5191; H04M 1/72572; H04M 2250/10; G01S 5/02; G01S 19/34; G01S 19/48; G01S 5/0205; G08B 13/1436; G08B 21/0247; G08B 21/0277

See application file for complete search history.

(56) References Cited

U.S. PATENT DOCUMENTS

| | | |
|---|---|---|
| 6,445,937 B1 | 9/2002 | daSilva |
| 8,504,066 B1 | 8/2013 | Green et al. |
| 9,119,038 B2 | 8/2015 | Woods et al. |
| 9,338,598 B2 | 5/2016 | Hakanson |
| 9,369,842 B2 | 6/2016 | Cronin |
| 9,413,805 B2 | 8/2016 | Sainsbury |
| 9,414,422 B2 | 8/2016 | Belghoul et al. |
| 10,187,745 B1 * | 1/2019 | Zhao .................... H04W 4/021 |
| 10,433,107 B1 | 10/2019 | Zhao et al. |
| 11,432,101 B2 * | 8/2022 | Zhao .................... H04W 4/021 |
| 2002/0068580 A1 | 6/2002 | Bala et al. |
| 2002/0072356 A1 | 6/2002 | Yamashita et al. |
| 2004/0127252 A1 | 7/2004 | Tsunomoto et al. |
| 2004/0176107 A1 | 9/2004 | Chadha |
| 2004/0219932 A1 | 11/2004 | Verteuil |
| 2006/0030333 A1 | 2/2006 | Ward et al. |
| 2006/0079243 A1 | 4/2006 | Bates et al. |
| 2007/0073870 A1 | 3/2007 | Park et al. |
| 2011/0054780 A1 | 3/2011 | Dhanani et al. |
| 2012/0115512 A1 | 5/2012 | Grainger et al. |
| 2013/0040644 A1 | 2/2013 | Lin et al. |
| 2013/0093627 A1 | 4/2013 | Cosman |
| 2013/0196670 A1 | 8/2013 | Kim et al. |
| 2013/0275221 A1 | 10/2013 | Zeto, III et al. |
| 2014/0365304 A1 | 12/2014 | Showers et al. |
| 2015/0109983 A1 | 4/2015 | Zhang et al. |
| 2015/0230056 A1 | 8/2015 | Shin et al. |
| 2015/0327012 A1 | 11/2015 | Bian et al. |

* cited by examiner

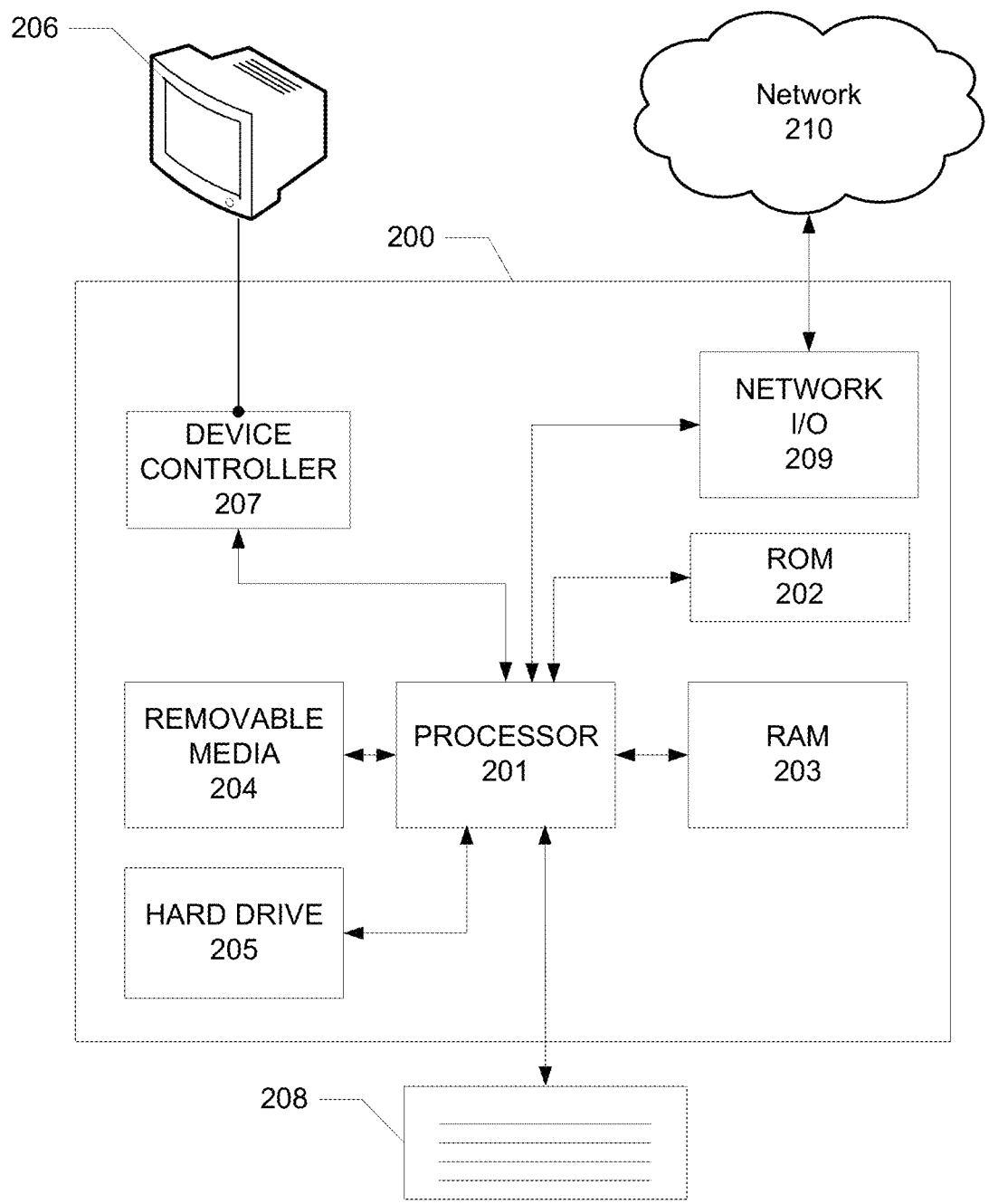

| 800 | | In home | | | Outside home | | |
|---|---|---|---|---|---|---|---|
| USER 1 | Living Room | Bedroom | Deck/Porch | In First Additional Region | In Second Additional Region | In Third Additional Region | In Another Geofence (Store) |
| Automated Actions | -switch to default channel<br>-push content to mobile device<br>-full access to streaming content | -turn off living room TV<br>-full access to streaming content<br>-set security system (motion detectors) | -turn off lights in home | -turn on STB<br>-turn on TV<br>-limited access to streaming content | -push content to other devices in same group<br>-limited access to streaming content | -turn up home temperature | -permit third party to push advertisements to mobile device |

805

| | | In home | | | Outside home | | |
|---|---|---|---|---|---|---|---|
| USER 2 | Living Room | Bedroom | Deck/Porch | In First Additional Region | In Second Additional Region | In Third Additional Region | In Another Geofence (Store) |
| Automated Actions | -turn on STB<br>-turn on TV in living room<br>-configure remote control U/I<br>-recommend content | -turn on TV in bedroom<br>-set security system (motion detectors) | -turn off lights in home | -turn off STB<br>-turn off TV in living room<br>-set security system (in its entirety)<br>-lock/unlock doors | -turn down home temperature (thermostat)<br>-permit users in same group to access content | -turn up home temperature (thermostat) | -permit third party to push advertisements to mobile device |

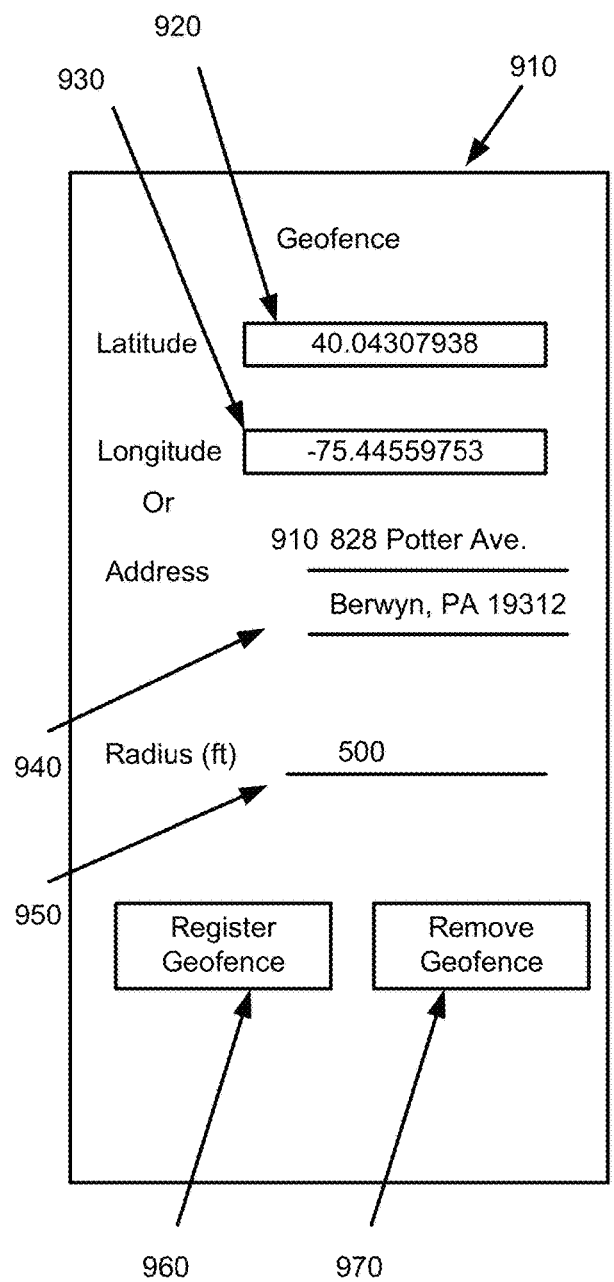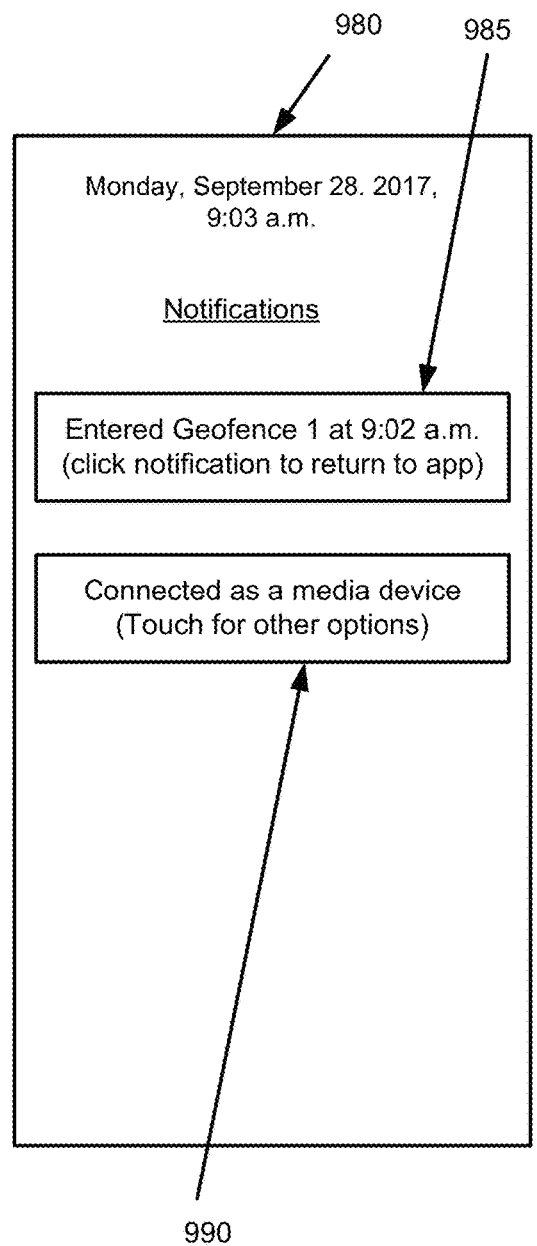

SYSTEM AND METHOD FOR ENERGY EFFICIENT GEOFENCING IMPLEMENTATION AND MANAGEMENT

CROSS-REFERENCE TO RELATED APPLICATIONS

This application is a continuation of and claims priority to U.S. patent application Ser. No. 16/212,774, filed Dec. 7, 2018, which is a continuation of U.S. patent application Ser. No. 15/708,288, filed Sep. 19, 2017 (now U.S. Pat. No. 10,187,745), each of which is hereby incorporated by reference in its entirety.

BACKGROUND

The prevalence of global positioning systems (GPS) and other types of location determination systems in mobile devices (e.g., cell phones, tablets, etc.) has allowed for the creation of so-called "geofences." A geofence may be a virtual fence drawn on a map and enforced using the GPS capabilities of a mobile device. Using a location determination system such as GPS, the location of a mobile device may be determined and then compared to the location of the virtual fence, and that comparison may result in a determination of whether the mobile device is inside of, or outside of, the virtual fence.

Battery power is used in determining the location of a user's mobile device (and thus the user) in a geofence environment. However, a location determination operation performed by the mobile device may consume a large amount of battery power of the mobile device, and may result in a need to recharge the mobile device fairly often, which is burdensome for the user. There remains an ever-present need for improving the energy efficiency of such geofence systems.

SUMMARY

This summary is not intended to identify critical or essential features of the disclosures herein, but instead merely summarizes certain features and variations thereof. Other details and features will also be described in the sections that follow.

A user device may be configured to use a variety of different approaches to determining its location. Some approaches may require a lot of battery power, and may be very accurate (e.g., using satellite GPS information, and/or recalculating every second), while other approaches may require less power and may be less accurate (e.g., using only cellular telephone tower location services, and/or recalculating location only once per minute). In some systems described herein, a single geofence may be defined based on its border on a map, and one or more additional ranges can be defined based on proximity to the border. The user device may be configured to use a less accurate/more energy efficient location determination technique when the user device is outside the geofence border, and when the user device crosses the geofence border, the user device may switch to using a more accurate/less energy efficient location determination technique, until the user device arrives at a target area (e.g., the user's home), whereby a more energy efficient location determination technique may again be used.

A method described herein may comprise determining a location of a user device in a geofence environment. The user may define a geofence boundary that surrounds a target area, and the mobile device may use different types of location determination techniques based on whether the mobile device is inside of, or outside of, the geofence boundary.

The geofence environment may include a first geofence that surrounds a target area. When the user device is determined to be located outside the first geofence, a next location determination of the user device is performed using a first location determination mode. When the user device is determined to be located inside the first geofence but outside the target area, the next location determination of the user device is performed using a second location determination mode that uses a greater amount of battery resources of the user device than the first location determination mode.

In some embodiments, the second location determination mode is similar to the first location determination mode (e.g., both use GPS signals to determine location), except that the second location determination mode performs a faster rate of polling and thus performs a faster next location determination than the first location determination mode, whereby each separate polling and location determination operation takes up a certain amount of battery power of the user device.

In some embodiments, when the user device is determined to be located inside the target area, the next location determination of the user device is performed using a location determination mode that uses a lesser amount of battery resources of the user device than when the user device is located outside the target area.

In some embodiments, the location determination mode used when the user device is located in the target area is similar to the location determination mode used when the user device is outside the target area, except that a slower rate of polling is performed.

In some embodiments, the location of the user device is determined using location signals. The determining the location of the user device may comprise receiving, by a server communicatively connected to the user device, location signals sent by the user device based on one of the first or second location determination modes performed by the user device. The determining may further comprise calculating a current position of the user device based on the received location signals. The determining may also comprise comparing the calculated position of the user with location information associated with the first geofence. The determining may further comprise determining, based on the comparing, whether the user device is located inside the first geofence or outside the first geofence.

In some embodiments, the location signals comprise WiFi signals provided by a WiFi network to determine location of the user device.

In some embodiments, the location signals comprise cellular signals output by cell towers of a cellular network to determine location of the user device.

In some embodiments, the second location determination mode polls for GPS signals to determine location of the user device, and utilizes more power resources of the user device than the first location determination mode, whereby the GPS signals provide a greater level of accuracy as compared to the first location determination mode In some embodiments, a determination is made as to whether the user device has crossed from outside of to inside of the first geofence, and if so, an operation is performed at the target area based on the crossing. The operation may include a turning on an air conditioning system of a home located in the target area, or opening a garage door of the home.

In some embodiments, a determination is made as to whether the user device has crossed from inside of to outside of the first geofence, and if so, an operation is performed at the target area based on the crossing. The operation may include, for example, a turning down or turning off an air conditioning system of a home located in the target area, or closing a garage door of the home. In some embodiments, speed is used as a criterion for determining which location determination mode to use. The second location determination mode may poll for GPS signals output by GPS satellites to determine location of the user device when the user device is moving at a rate of speed greater than a predetermined rate of speed, and the location determination mode may poll for WiFi signals output by a WiFi network to determine location of the user device when the user device is moving at a rate of speed less than or equal to the predetermined rate of speed.

In some embodiments, an amount of time spent in a particular geofence region is used as a criterion for determining which location determination mode to use, since the longer a user spends in a particular geofence region, the less likely the user will be moving out of that geofence region in the near future, and thus the less frequent the next location determination mode is to be performed. For example, for a GPS location determination mode, the GPS polling frequency may be lessened if the user has been determined to be located within a particular geofence region for at least a particular amount of time (e.g., more than 2 hours) in a geofence region that is located between an inner geofence and an outer geofence.

In some embodiments, there may be provided various concentric geofences, and various intermediate ranges at which different location determination modes may be used based on the location of a user device with respect to the geofences. When the user device is determined to be located outside a first geofence that surrounds a target area, a next location determination of the user device is performed using a first location determination mode. When the user device is determined to be located inside the first geofence but outside of a second geofence that is closer to the target area than the first geofence, the next location determination of the user device is performed using a second location determination mode that uses a greater amount of battery resources of the user device than the first location determination mode. When the user device is determined to be located inside of the second geofence but outside of the target area, the next location determination of the user device is performed using a third location determination mode that uses a greater amount of battery resources of the user device than the second location determination mode. This is based on the principle that the closer a user is currently located with respect to a target area, the more accurate and the more quicker the location determination should be performed, since typically the number of operations to be performed with respect to the target area (e.g., open a garage door, turn on a HVAC system in the user's home) increase as the user gets closer to the target area. As an example, the second geofence surrounds an area corresponding to the user's home (the "target area") and front and back yards adjacent to the user's home, and the first geofence surrounds a ¼ mile circular region centered on the user's home and that includes the user's home, the user's front and back yards, and neighboring areas.

The foregoing methods and other methods described herein may be performed by a system, a computing device, a computer readable medium storing computer-executable instructions for performing the methods, and/or an apparatus having a processor and memory storing computer-executable instructions for performing the methods.

BRIEF DESCRIPTION OF THE DRAWINGS

Some features herein are illustrated by way of example, and not by way of limitation, in the figures of the accompanying drawings and in which like reference numerals refer to similar elements.

FIG. 2 illustrates an example hardware and software platform on which various elements described herein can be implemented.

FIG. 8 illustrates example user profiles that correlate users' locations to automated actions according to one or more illustrative aspects of the disclosure.

FIG. 9A illustrates an example user interface for enabling a user to set up a geofence environment according to one or more illustrative aspects of the disclosure.

FIG. 9B illustrates an example user interface for providing a user with geofence notifications according to one or more illustrative aspects of the disclosure.

DETAILED DESCRIPTION

Figure 1:
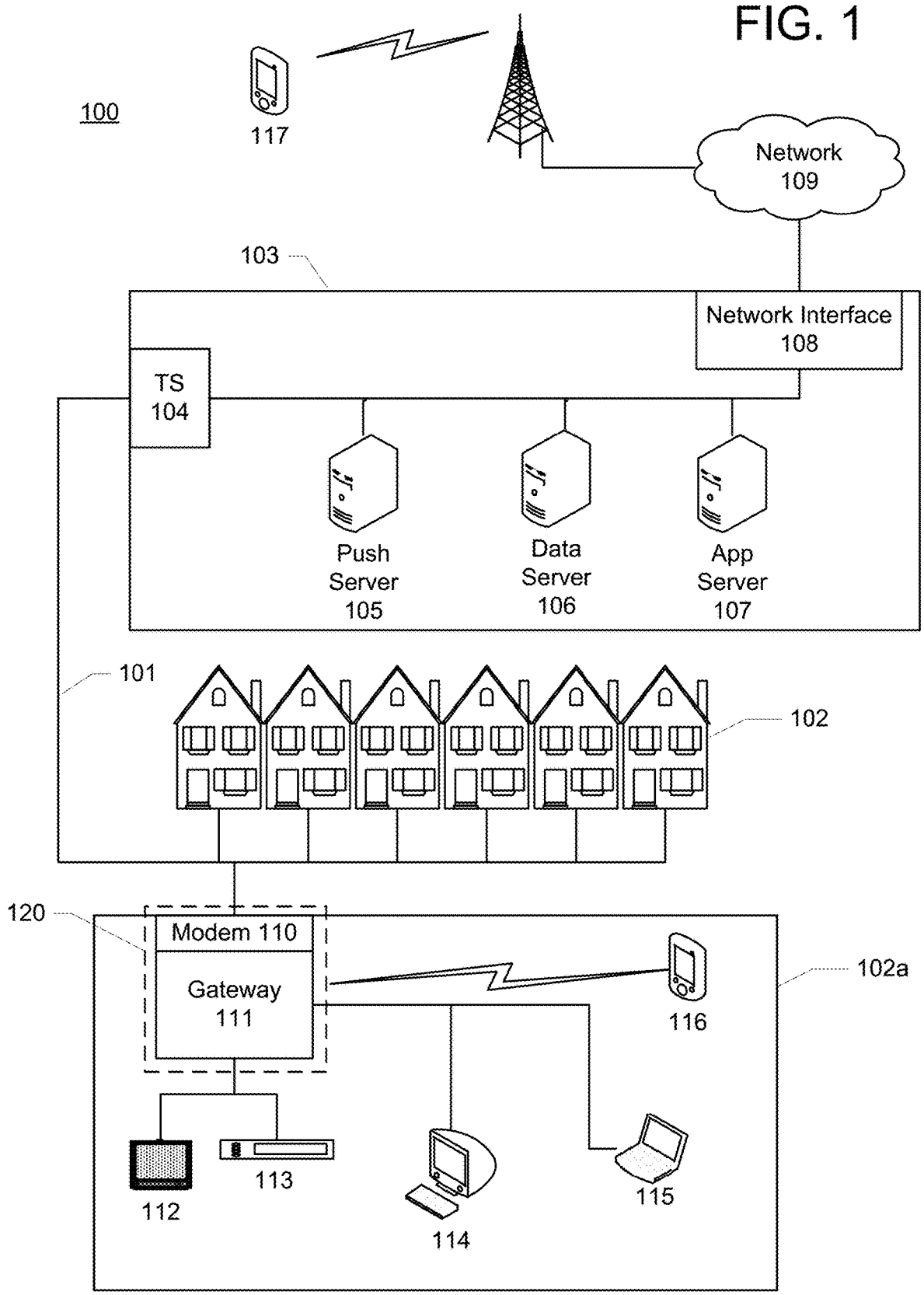
FIG. 1 illustrates an example information access and distribution network.

FIG. 1 illustrates an example information access and distribution network 100 on which many of the various features described herein may be implemented. The network 100 may be any type of information distribution network, such as satellite, telephone, cellular, wireless, etc. One example may be an optical fiber network, a coaxial cable network or a hybrid fiber/coax (HFC) distribution network.

Such networks 100 use a series of interconnected communication links 101 (e.g., coaxial cables, optical fibers, wireless connections, etc.) to connect multiple premises, such as locations 102 (e.g., homes, businesses, institutions, etc.), to a local office 103 (e.g., a central office or headend). The local office 103 may transmit downstream information signals onto the links 101, and each location 102 may have a receiver used to receive and process those signals.

There may be one link 101 originating from the local office 103, and it may be split a number of times to distribute the signal to various locations 102 in the vicinity (which may be many miles) of the local office 103. Although the term home is used by way of example, locations 102 may be any type of user premises, such as businesses, institutions, etc. The links 101 may include components not illustrated, such as splitters, filters, amplifiers, etc. to help convey the signal clearly. Portions of the links 101 may also be implemented with fiber-optic cable, while other portions may be implemented with coaxial cable, other links, or wireless communication paths.

The local office 103 may include an interface 104, which may be a termination system (TS), such as a cable modem termination system (CMTS), which may be a computing device configured to manage communications between devices on the network of links 101 and backend devices such as servers 105-107 (to be discussed further below). The interface 104 may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream channels or frequencies to be received by devices, such as modems at the various locations 102, and to receive upstream communications from those modems on one or more upstream frequencies. The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the network 109, and to other devices on the network such as a cellular telephone network and its corresponding cell phones (e.g., cell phone 117).

As noted above, the local office 103 may include a variety of servers 105-107 that may be configured to perform various functions. For example, the local office 103 may include a push notification server 105. The push notification server 105 may generate push notifications to deliver data and/or commands to the various locations 102 in the network (or more specifically, to the devices in the locations 102 that are configured to detect such notifications). The local office 103 may also include a data server 106. The data server 106 may be one or more computing devices that are configured to provide data to users in the homes. This data may be, for example, video on demand movies, television programs, songs, text listings, etc. The data server 106 may include software to validate user identities and entitlements, locate and retrieve requested data, encrypt the data, and initiate delivery (e.g., streaming) of the data to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting data such as television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the locations 102.

An example location 102a may include an interface 120. The interface may comprise a device 110, such as a modem, which may include transmitters and receivers used to communicate on the links 101 and with the local office 103. The device 110 may be, for example, a coaxial cable modem (for coaxial cable links 101), a fiber interface node (for fiber optic links 101), or any other desired modem device. The device 110 may be connected to, or be a part of, a gateway 111 (e.g., a gateway interface device). The gateway 111 may be a computing device that communicates with the device 110 to allow one or more other devices in the home to communicate with the local office 103 and other devices beyond the local office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

FIG. 2 illustrates general hardware and software elements that can be used to implement any of the various computing devices (e.g., terminal devices, remote control devices, etc.) discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, hard drive, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc.

The computing device 200 may also include one or more network interfaces 209, such as input/output circuits (such as a network card) to communicate with an external network 210. The interface 209 may be a wired interface, wireless interface, or a combination of the two. In some embodiments, the interface 209 may include a modem (e.g., a cable modem), and the network 210 may include the communication links 101 discussed above, the external network 109, an in-home network, a provider's wireless, coaxial, fiber, or hybrid fiber/coaxial distribution system (e.g., a DOCSIS network), or any other desired network. The computing device 200 may communicate with the external networks 210 or other devices using one or more communication protocols, such as wired communication protocols and wireless communication protocols (e.g., Wi-Fi, Bluetooth, ZigBee, Z-Wave, etc.).

Figure 3A:
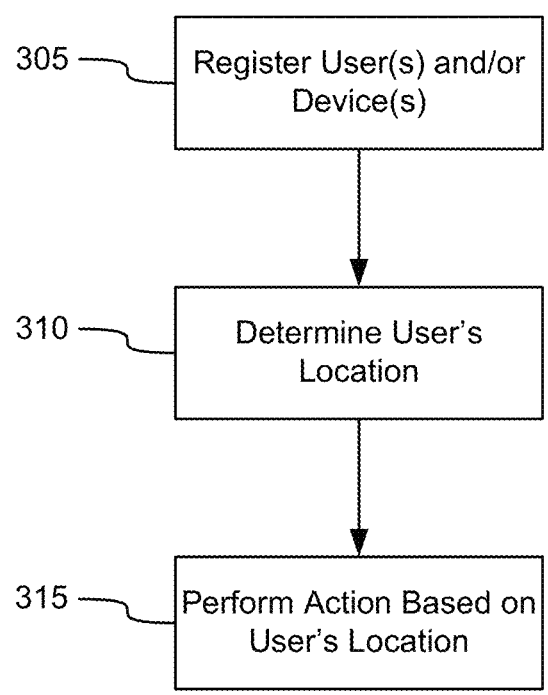
FIG. 3A illustrates an example summary of a method of performing actions based on a user's location according to one or more illustrative aspects of the disclosure.

FIG. 3A illustrates an example summary of a method of performing actions based on a user's location with respect to a geofence environment comprising one or more boundaries according to one or more illustrative aspects of the disclosure. The steps may be performed by one or more computing devices. The computing device may be, for example, with reference to FIG. 1, application server 107, gateway 111, computer 114, a device at the location 102a, a device at the local office 103, and/or a remote device that can communicate with the location 102a or the local office 103.

In step 305, the computing device may register a user and/or the user's devices (e.g., a mobile device, such as a cell phone) for location services. The computing device may also generate and/or store a user profile that correlates automated actions with the user's current location, as will be described in further detail in the examples that follow. The location services described herein may be opt-in. Therefore, each user may decide whether or not to have his or her location tracked for use with the location services by, e.g., registering with the system. Step 305 will be described in further detail in the examples that follow. For example, the user may set certain actions to be taken based on the user's location within a geofence environment, whereby those actions may include opening or closing the user's garage door at his/her home when the user crosses a geofence boundary. Also, the user may set up a geofence environment with one or more geofences provided around a target area such as the user's home, whereby the geofence environment may be set up using one of the user interface displays shown in FIGS. 9A, 9B and 9C.

Figure 9C:
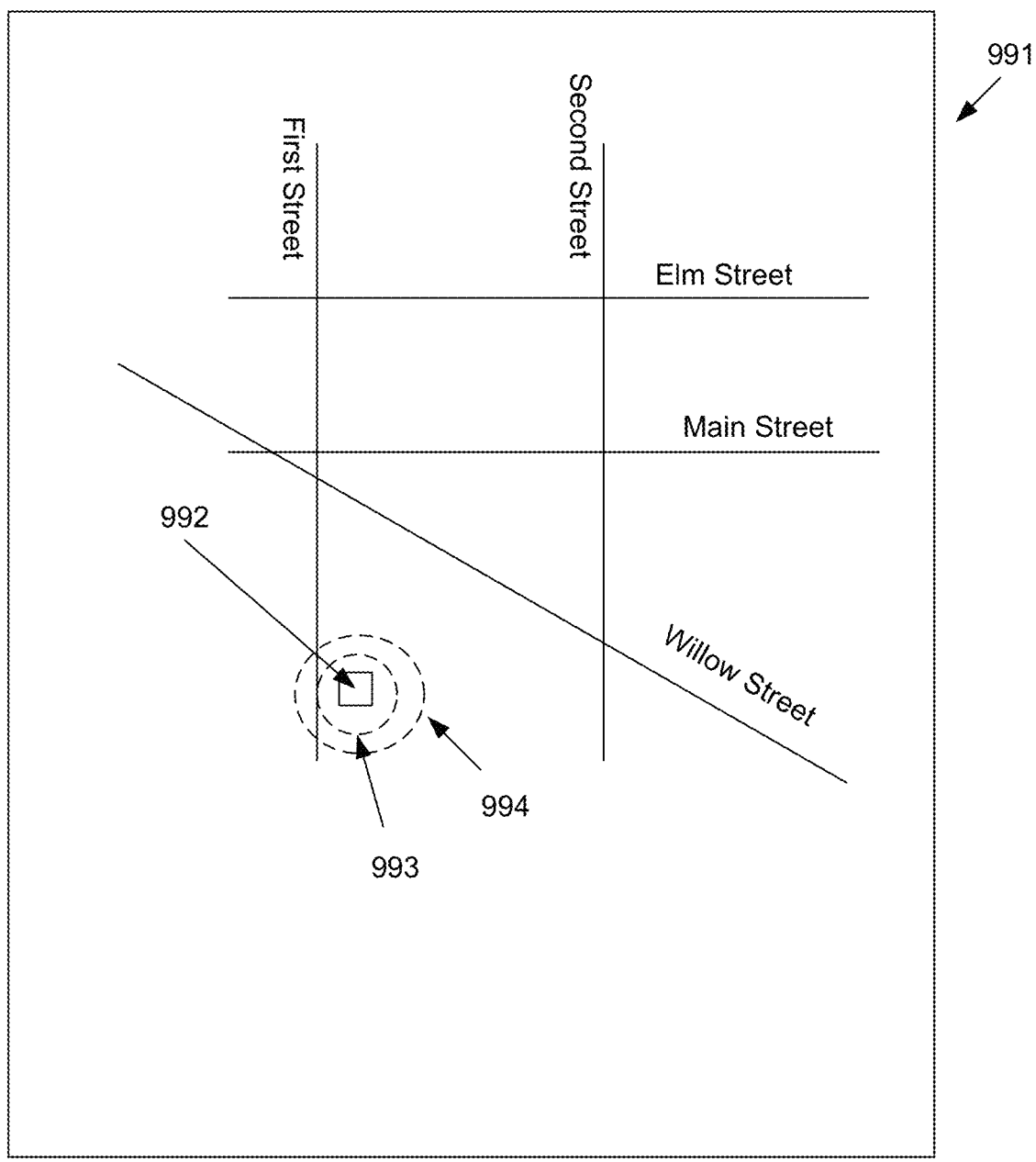
FIG. 9C illustrates an example map user interface for enabling a user to set up a geofence environment according to one or more illustrative aspects of the disclosure.

In step 310, the computing device may determine the user's location by, for example, using a highly accurate (but highly power consuming) location determination mode (e.g., using GPS signals, or using WiFi signals from a WiFi access point), and to then compare the location of the user's mobile device with respect to a geofence environment that may include one or more concentric virtual fences or boundaries centered around the user's home or place of business (and which may be created using a user interface display such as shown in FIG. 9A, 9B or 9C, for example). As will be discussed in the examples below, the computing device may use one of several different wireless communication protocols and/or wireless networks (e.g., Wi-Fi, Cellular, GPS and/or Bluetooth) to determine the user's location based on where the computing device is located with respect to the one or more concentric virtual fences of the geofence environment. The geofence environment may be created by the user beforehand (e.g., by way of the user interface display shown in FIG. 9A, 9B or 9C), whereby the user may also set actions to be performed at a target area (e.g., the user's home) when the user crosses a geofence of the geofence environment.

GPS location determination may be performed by the user's device (e.g., a mobile device) receiving time signals sent from global positioning satellites, which are received and processed by the mobile device to estimate its position by performing a triangulation process of signals received from three or more global positioning satellites, in a manner known to those of ordinary skill in the art. Such processing of GPS signals to compute the mobile device's location may take up a certain amount of power resources of the mobile device (both in reception of GPS signals and the processing of received GPS signals to compute a location based on the received GPS signals), whereby the tradeoff is that an accurate location of the device is obtained as a result.

Cellular location determination may be performed by the mobile device receiving a beacon signal output by a cellular tower, which is received and processed by the mobile device to estimate its position based on known cell tower location. Cellular location determination does not take up much power of the mobile device, since the mobile device is already searching for cellular beacons in its normal operation mode of periodically searching for an available cellular communications network. However, cellular location determination typically gives a rough location determination in that reception of a cellular beacon signal from a cell tower enables a determination that the mobile device is located somewhere within a cell covered by the cell tower, which can cover a fairly large region (e.g., a 5 mile diameter circular region centered around the location of the cell tower).

WiFi location determination may be performed by the mobile device receiving beacon signals output by one or more WiFi access points, which are received and processed by the mobile device to estimate its position based on known WiFi access point locations. WiFi location determination does not take up much power of the mobile device, since the mobile device is already searching for WiFi beacons in its normal operation mode when WiFi is turned ON. Bluetooth location determination may be performed in a similar manner as WiFi location determination. The various examples above involve the mobile device receiving signals from stationary sites in known locations, such as cell towers and WiFi routers, and assigns the location of the mobile device to that known location. In alternative embodiments, the stationary sites may receive a signal from the mobile device, and may triangulate the location of the mobile device using the signal received from the mobile device, to thereby assign the location the location of the mobile device to a location different than the location of the stationary se.

The location determination may also be performed using a location determination scheme operating at: a) a high update or polling rate that consumes a large amount of battery strength of the user's mobile device, b) an intermediate update or polling rate that consumes a lesser amount of battery strength of the user's mobile device, or c) a slow update or polling rate that consumes a smaller amount of battery strength of the user's mobile device (since each separate polling of GPS signals takes up power due to reception of the signal and processing of the signals to determine a location of the mobile device). The update or polling rate chosen for the location determination scheme may depend on where the user's mobile device has been determined to be located with respect to the one or more concentric virtual fences on a most recent location determination of the mobile device. By way of example, an intermediate update or polling rate of once every 10 seconds may consume 10% of a mobile device's battery strength per hour, whereas a slow update or polling rate of once every minute may consume 3% of a mobile device's battery strength per hour. Location determination using GPS signals typically takes up more power resources of a mobile device than location determination using signals output by WiFi access points, and location determination using signals output by WiFi access points typically takes up more power resources of the mobile device than location determination using signals output by cell towers (since WiFi mode is an optional mode that may or may not be turned ON by a user when a mobile device is turned ON, whereby cellular signal reception by a mobile device is typically turned ON when the mobile device is turned ON).

In step 315, the computing device may perform one or more actions based on the user's current location. For example, the computing device may send an instruction to a display device or set-top box located in a living room of the user's home when the user's mobile device is determined to have entered the user's home that is located within an innermost virtual geofence (also referred to herein as 'innermost geofence' or 'inner geofence'). The innermost geofence may be located a short distance from the user's home, such as 100 feet outside the user's home. As another example, the computing device may send an instruction to activate a home security system when the user has moved from the innermost geofence region to a virtual fence region of the geofence environment that corresponds to a toroidal-shape region that is located between the innermost geofence and a middle virtual fence (also referred to herein as 'middle geofence'). The middle virtual fence may be a circular-shaped virtual fence located within a predetermined distance from the user's home (e.g., 1000 feet from the user's home), or other shaped virtual fence (e.g., rectangular, trapezoidal, or square-shaped). As yet another example, the computing device may send an instruction to turn off the home air conditioning system when the user has moved from a first geofence region between the inner geofence and the middle geofence, to a second virtual fence region that corresponds to a toroidal-shape region that is located between the middle geofence and an outermost virtual fence (also referred to herein as 'outermost geofence' or 'outer geofence') that is further from the user's home than the middle geofence.

Figure 3B:
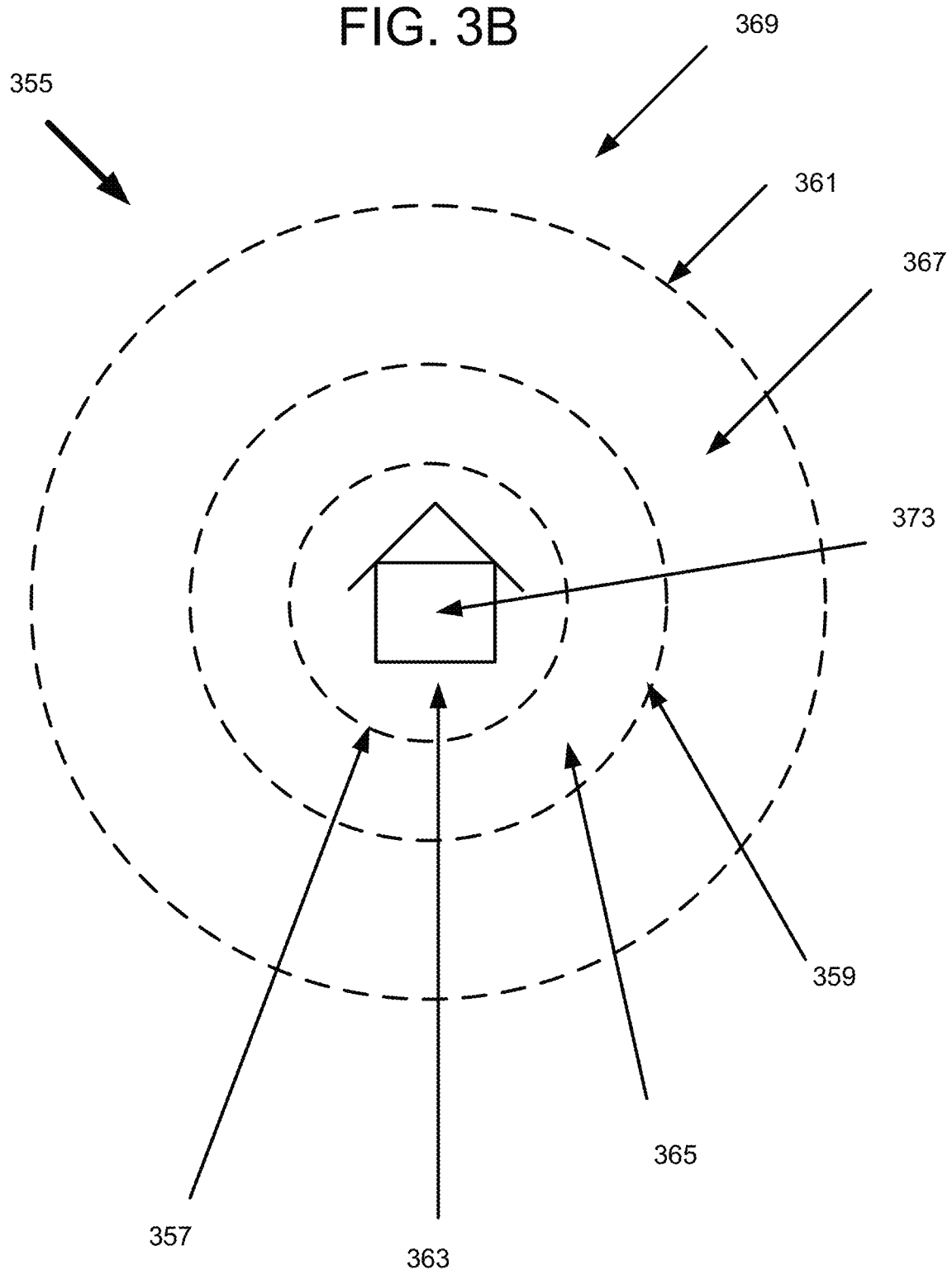
FIG. 3B illustrates an example geofence environment according to one or more illustrative aspects of the disclosure.

FIG. 3B shows a geofence environment 355 having an inner geofence 357, a middle geofence 359, and an outer geofence 361. The geofence environment comprises a first geofence region 363 surrounded by the inner geofence 357, a second geofence region 365 located between the inner geofence 357 and the middle geofence 359, a third geofence region 367 located between the middle geofence 359 and the outer geofence 361, and a fourth geofence region 369 located outside of the outer geofence 361. The user's home 373 may be considered as part of the first geofence region 363 in some embodiments. In other embodiments, the first geofence region 363 may correspond to a region within the inner geofence 357 but outside of (and thus separate from) the user's home 373, such as a front yard area and back yard area adjacent to the user's home 373. A geofence region may be defined in some embodiments with relation to a geofence, in which an inner geofence region corresponds to a region inside of (e.g., surrounded by) the geofence, and an outer geofence region corresponds to a region outside of the geofence.

Figure 4:
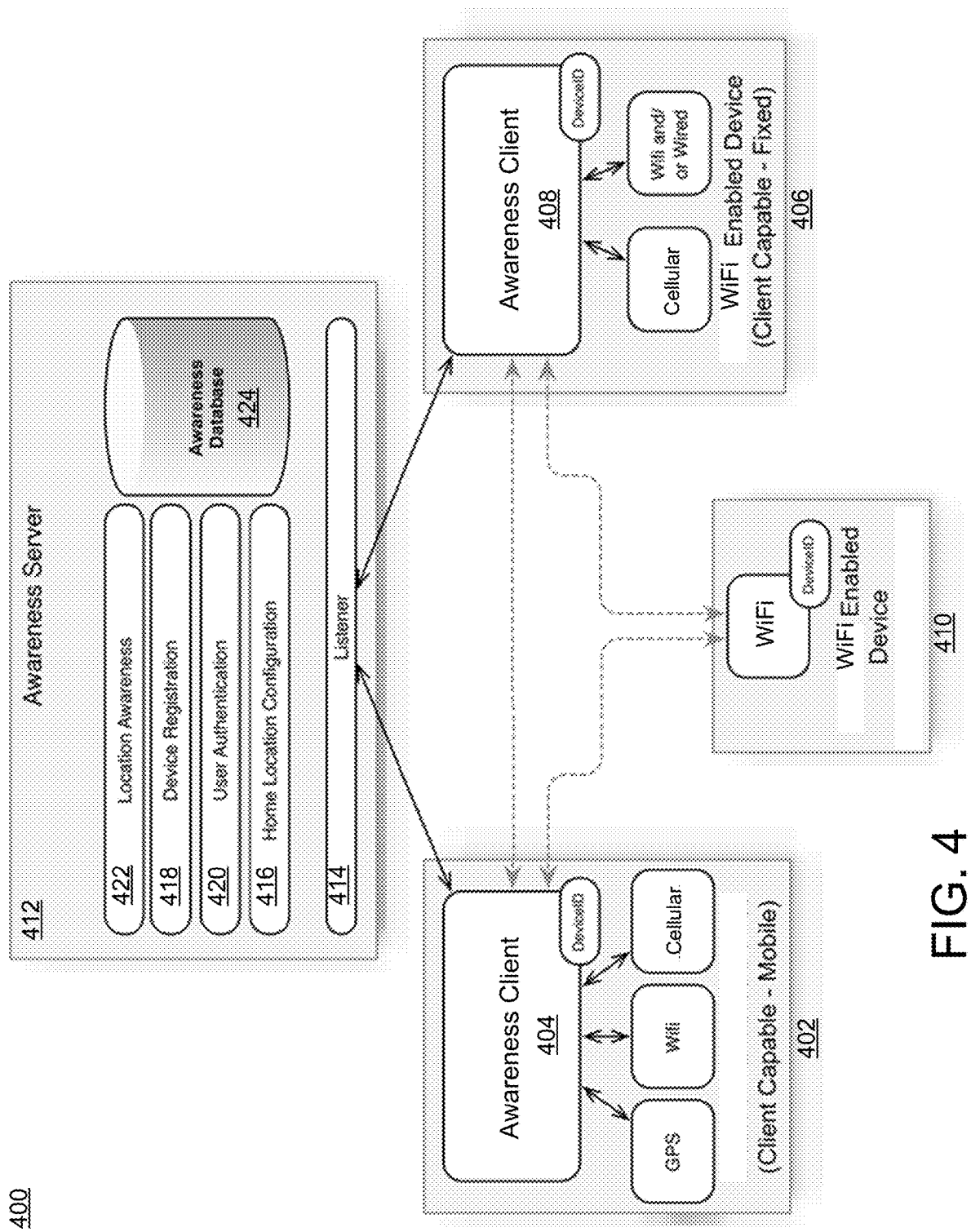
FIG. 4 illustrates an example network of devices used to determine users' locations and corresponding actions based on users' locations according to one or more illustrative aspects of the disclosure.

FIG. 4 illustrates an example network 400 of devices used to determine users' locations and corresponding actions based on users' locations according to one or more illustrative aspects of the disclosure. The network 400 may include a user device 402, such as a mobile device. Examples of mobile devices include, for example, a mobile phone 116 or 117, a tablet, a laptop computer 115, a PDA, or any other desired device. The mobile device 402 may include an awareness client 404, which may be a software client running on the mobile device 402. In some aspects, the awareness client 404 may operate on a mobile operating system, such as GOOGLE ANDROID, APPLE iOS, and the like. The mobile device 402 may also have an associated device identifier, such as an IP address, a range of IP addresses, a MAC address, a device name, or any other identifier that uniquely identifies the mobile device 402. The user may also be able to assign an identifier to the mobile device 402, such as naming the device. The mobile device 402 may also have wireless (or wired) communication and/or location capabilities. For example, the mobile device 402 may have a GPS transceiver, a Wi-Fi transceiver, a cellular transceiver (for communicating over cellular telephone networks), and a Bluetooth transceiver (not shown in FIG. 4). As will be discussed in further detail below, the mobile device 402 may send and receive messages over GPS, Wi-Fi, cellular networks and/or Bluetooth, to determine its location and/or which networks and devices the mobile device 402 is or can connect to. The location information may be transmitted, such as by the awareness client 404 of the mobile device 402, to the awareness server 412, as will be discussed in further detail below.

The network 400 may also include a device 406, such as a location monitoring device, a gateway, a television, a PC, or any other desired computing device. The device 406 may be fixed in its location such that it is typically not moved by the user. The fixed device 406 may have all or some of the same capabilities as the mobile device 402. For example, the fixed device 406 may be associated with a unique identifier. A user may name his or her set-top box (e.g., Fred's Living Room set-top box). The fixed device 406 may also have an awareness client 408 running over an operating system. The fixed device 406 may also have wireless (or wired) communication and/or location capabilities. The example fixed device 406 illustrated in FIG. 4 has a GPS transceiver, a Wi-Fi transceiver, and an interface for wired communications (e.g., Ethernet, coaxial communication, optical fiber communication, etc.). The fixed device 406 may also send and receive messages over wireless or wired networks to determine its location and/or which networks and devices the fixed device 406 is or can connect to. For example, the fixed device 406 may communicate with the mobile device 402 via Bluetooth or Wi-Fi. Location information may be transmitted, such as by the awareness client 408 of the fixed device 406, to the awareness server 412, as will be discussed in further detail below.

The network 400 may also include a device 410, which may be a device capable of communicating using one or more of a plurality of communication protocols. The example device 410 illustrated in FIG. 4 can communicate with other devices via WiFi. However, the device 410 might not be able to communicate over, for example, Bluetooth and/or cellular signals. In some embodiments, an awareness client could be placed on the WiFi-only device 410. However, this need not be the case; the WiFi-only device 410 might not have an awareness client. The WiFi-only device 410 may broadcast WiFi signals, which may be used to analyze signal strengths in order to determine or refine the location of user devices and their associated devices, as will be discussed in further detail in the examples below. The WiFi-only device 410 may also be registered (e.g., paired) with one or more other devices, such as the mobile device 402 and the fixed device 406. The WiFi devices may be located, for example, at the user's home 373, in a particular room in the user's home 373, in the user's car, outside of the user's home 373, etc.

The network 400 may also include an awareness server 412. The awareness server 412 may comprise one or more computing devices, such as the servers 105, 106, and/or 107 at the local office 103. The awareness server 412 may also be cloud-based, utilizing one or more networked computing devices to receive, process, store, and send information. In some aspects, the awareness server 412 may receive information (including location information) from the user's mobile device 402. For example, the awareness clients 404 of the user's mobile devices 402 may send information in real time to a listener 414 of the awareness server 412. The listener 414 may comprise a software application that actively prompts and/or listens for information, including requests made, from various client devices. Communications among devices in FIG. 4 may be direct or via one or more intermediate devices, e.g., nodes, and other networks.

The awareness server 412 may include other software and/or hardware components. For example, a home location configuration application 416 may allow a user to configure his or her home topology and map devices to the configured topology. A device registration application 418 may allow a user to register devices (discovered by the user's mobile device 402, such as other user devices, and GPS-enabled and WiFi-enabled devices). The device registration application 418 can also be populated in other ways such as with information for devices that are purchased via other ways (like buy flows or point of sale applications). A user authentication application 420 may correlate user devices with user identifiers, such as usernames/passwords for a service provider account, a social media account (e.g., FACEBOOK, TWITTER, and the like). By correlating user devices with user identifiers, the user might not have to provide a password to log into each account. Rather, the user might automatically be logged on to some or all of the user's accounts by, for example, bringing his or her device within the proximity of another device, such as a fixed device in the home.

A location awareness application 422 may be used to determine where the user is located based on one or more pieces of information it has received from the user's mobile device 402, when the mobile device is allowed to accept such information to be explained in more detail with respect to some embodiments. Example location information include, but are not limited to, identity of the device having the highest signal strength relative to the user device, Wi-Fi or wired Internet Protocol information, mobile geo-location information (e.g., from GPS or cellular radios), and other device and user information the location awareness application 422 could access on its own (e.g., information stored in the cloud). The location awareness application 422 may determine (or estimate) the user's location, the identity of the user, and which devices (e.g., the mobile device 402, the fixed device 406, or the WiFi device 410) the user is using or is near. User, device, location (raw or determined), and other information may be stored in an awareness database 424. The methods described herein may be performed by the aforementioned network of devices 400 or by a similar system.

In some aspects, all or a portion of the information stored in the awareness server may be replicated or otherwise copied to a device in the location 102a and/or user device or another accessible device in the network. For example, a particular user's profile, which might include user information, device information, location information, and other information, may be cached at a device in the location 102a, such as the gateway 111. The same may be done for other users (e.g., users at each of the locations 102). By caching the information, the amount of time to access the information may be reduced.

Figure 5:
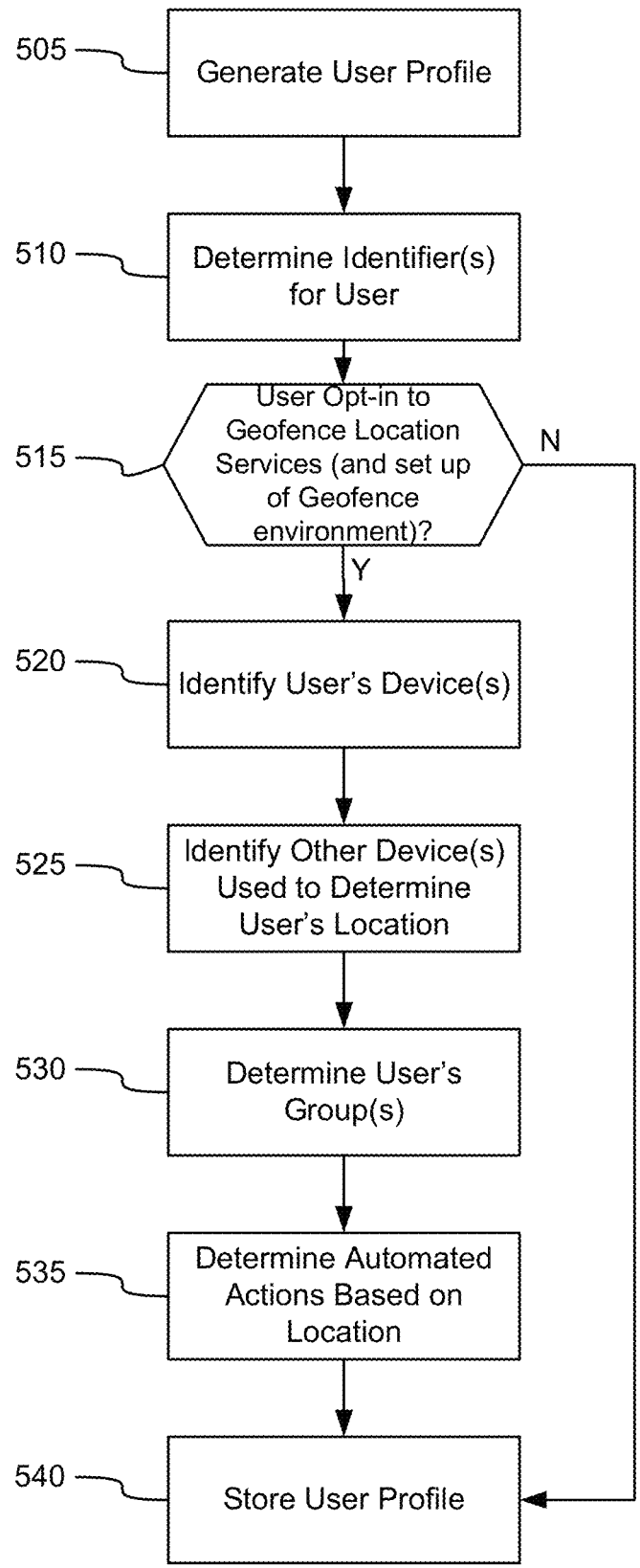
FIG. 5 illustrates an example method of generating and storing a user profile according to one or more illustrative aspects of the disclosure.

FIG. 5 illustrates an example method of generating and storing user profiles according to one or more illustrative aspects of the disclosure. The method may be performed by any of the computing devices described herein, including cloud computing devices, computing devices at the local office 103, computing devices within the location 102, and/or mobile computing devices (e.g., a mobile phone).

In step 505, the computing device may generate (e.g., create) a user profile used for or associated with location services. Location services may include, for example, tracking the user's location and performing automated actions based on the user's location, such as by polling the user device in a periodic manner. If a profile for the user already exists, such as if it was previously generated, the computing device may instead retrieve the user's profile. For example, a user profile may have been generated when the user signed up for internet access through an internet (or other) service provider. When the user desires to sign up for location services, the computing device may retrieve the user's internet service provider profile rather than generating a new profile. As will be discussed in further detail in the examples below, the user profile may identify users' preferences and be used to identify the topology of the user's home, devices, identifiers, telephone numbers, and the like. For example, the user profile may associate the user's locations with one or more automated actions.

Figure 6:
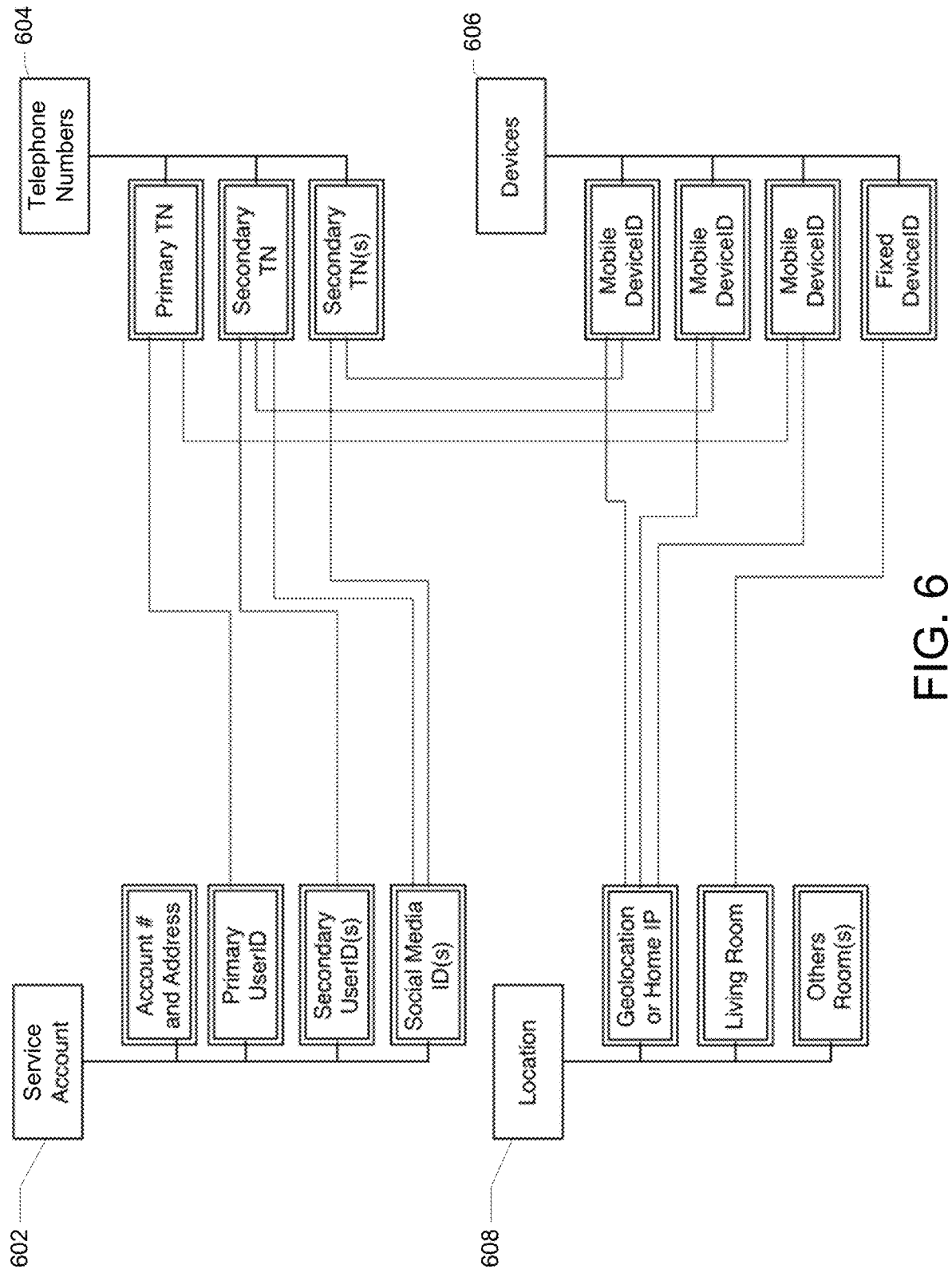
FIG. 6 illustrates an example interconnection of users' service accounts, locations, telephone numbers, and device identifiers according to one or more illustrative aspects of the disclosure.

In step 510, the computing device may determine identifiers for the user. Referring now to FIG. 6, that figure illustrates an example interconnection of users' service accounts, locations, telephone numbers, and device identifiers according to one or more illustrative aspects of the disclosure. Example user identifiers may be associated with data from one or more service accounts 602, such as an account number, a user's physical address, a user's email address, the primary accountholder's user identifier, a secondary accountholder's user identifiers, and social media identifiers (e.g., FACEBOOK username and/or password, TWITTER username and/or password, and the like).

User identifiers may also comprise (or be associated with) one or more telephone numbers 604, such as the user's telephone number (e.g., a mobile phone number), a primary user's primary telephone number, a primary user's secondary telephone number, a secondary user's primary telephone number, and a secondary user's secondary telephone number. Each of the telephone numbers 604 may be mapped to a service account identifier 602. For example, a user's primary telephone number 1-123-456-7890 may be mapped to (or otherwise correlated with) the primary user's service account ID. A secondary user's primary telephone number 1-555-333-1212 may be mapped to the secondary user's identifier (e.g., test_user@comcast.net) and the secondary user's FACEBOOK account.

In some aspects, primary and secondary users may form a group of users for location services. A primary user may add one or more secondary users to the primary user's account. The secondary users may, but need not, be related to the primary user. For example, the group may comprise a mobile phone family plan. Each family member's mobile number may be mapped back (e.g., paired) with that family member's service account identifier. Alternatively, more than one family member's number could be mapped to a single service account identifier, or more than one service account identifier could be mapped to a single telephone number. Details on grouping users for location services will be discussed in further detail in the examples below.

Returning to FIG. 5, in step 515, the computing device may determine whether the user has opted-in to geofence location services (e.g., to have the user's locations tracked). If the user has not opted-in to geofence location services, the method illustrated in FIG. 5 may end, and the computing device may store the user's profile in step 540. If the user has opted-in to geofence location services, the computing device may add and/or correlate other information with the user's profile. By way of example, a geofence environment may have been previously set up by the user, or it may be set up in this step, such as by way of the user interface displays shown in FIGS. 9A, 9B and 9C.

In step 520, the computing device may identify and/or store an identifier for each of the user's devices. The user may provide a list of his or her devices to the computing device. Additionally or alternatively, the computing device may automatically detect the user's devices. For example, the computing device may identify each device having a location service application, such as the awareness client 404 or the awareness client 408 that the user has signed on to. The computing device may also automatically add devices that connect to a particular network (e.g., an in-home Wi-Fi network or Z-Wave network) to the list of devices. When a device is automatically added, the computing device may trigger a message (e.g., an email, a text message, a popup message, etc.) to be sent to an owner of the network to validate the device (e.g., as a trusted device or a guest device). A website or mobile application may also be used to correlate a user with the user's devices. For example, a graphical user interface (GUI) used to configure the topology of the user's home, such as a GUI similar to the one illustrated in FIG. 7, may be used by the user to input information for the user's devices. Social media accounts may also be used to link users to devices. For example, when the user signs on to the social media account on a particular device, the website or application used to perform the sign-on could send information identifying the user device to the awareness server 412 to be stored in the awareness database 424.

As previously discussed, the devices may include a mobile phone, tablet, laptop computer, PDA, or any other mobile device (e.g., devices that the user might carry). As illustrated in FIG. 6, each device 606 may have one or more device identifiers. Example identifiers include IP addresses, MAC address, device name, or any other identifier that uniquely identifies the device, as previously discussed. As illustrated in FIG. 6, each device can be mapped to one or more telephone number 604, which may in turn be mapped to one or more service account identifier 602. Alternatively, a device may be mapped directly to a service account identifier 602, such as if the device does not have a telephone number (e.g., a Wi-Fi only device).

Returning to FIG. 5, in step 525, the computing device may identify and/or store an identifier for other devices that may be used to determine the user's location. These other devices may include, for example, the fixed devices 406 and/or the WiFi-enabled devices 410 illustrated in FIG. 4. The methods for identifying these other devices may be the same (or similar) to the methods used to identify the user's devices described with reference to step 520. For example, the user may provide a list of these devices to the computing device, or the computing device may automatically detect these devices. For Bluetooth-compatible devices, the device name or ID may be part of the Bluetooth specification.

Referring also to FIG. 1 and FIG. 3B, a gateway device, such as the gateway 111, may be used to determine the user's location when the user is in the user's home 373 and thus inside the inner geofence 357. For example, the gateway 111 may be a set-top box with Bluetooth capability. As an example, the gateway 111 may be (or be connected to) a wireless (e.g., Wi-Fi) router that provides a wireless network. As will be discussed in the examples below, the device's connection to the wireless network may be used to determine that the user is currently within the user's home 373 or a predetermined distance from the user's home 373, such as inside the middle geofence 359 but outside the inner geofence 357. Furthermore, IP addresses (or address ranges) may identify the physical location of the device having the IP address or IP address range. For example, a home Wi-Fi network might have a predetermined IP address range. If a device has an IP address within that range, the computing device may determine that the device is within the inner geofence 357 and thus either in the user's home 373 or just outside the user's home 373.

Any of the mobile devices 402, fixed devices 406, and Bluetooth-enabled devices 410 may be used to identify any of the other mobile, fixed, and Bluetooth-enabled devices. For example, the mobile device 402 may have an application, which may be the awareness client 404, that scans for other devices with WiFi capabilities within the range of the mobile device 402, such as the fixed device 406 (if it has WiFi capabilities) or the WiFi-enabled device 410. The mobile device 402 may identify the WiFi-enabled device during an exchange of messages with that device over a WiFi network. For example, the WiFi-enabled device may send an identifier for itself to the mobile device 402 during the exchange. The mobile device may send, to the awareness server 412, identifiers for the WiFi-capable devices it detects, and the identifiers may be stored in the profile of the user associated with the mobile device 402. This may be especially beneficial when a WiFi-enabled device 410 cannot communicate directly with awareness server 412. The fixed device 406 may similarly be used to identify other mobile, fixed, and WiFi-enabled devices and send the identifiers to the awareness server 412.

Returning to FIG. 5, in step 525, the computing device may also determine and/or store the location of each device that may be used to determine the user's location or otherwise associate the device with the user when the user is within the inner geofence 357 of the geofence environment 355. For example, in FIG. 6, devices 606 may be associated with one or more location 608.

The computing device may determine the location of each device that could be used to determine a user's location when the user is located within the user's home 373. The user may manually enter the location for each device into the user's device (e.g., a mobile phone). For example, the user may enter the device identifier and the location of the device (e.g., the living room within the user's home 373) into the user's mobile device. As discussed above, the user may provide information to a GUI to associate devices with rooms. Alternatively, the awareness server might already know the identity of each of the devices, but not know the location of each device. The awareness server may send the identity information to the user's mobile device, and the mobile device may prompt the user to input the location for each of the devices. Once the user provides the location for each device, the locations may be stored in the user's profile (e.g., in an awareness database in the awareness server).

In some aspects, the location of each device may be determined within the user's home 373 of FIG. 3B based on the name of one of the devices (e.g., a gateway device) and its proximity to other devices. For example, a user may name the user's STB "Living Room's Set Top Box." The computing device may determine that that particular STB is in a living room of the user premise based on character recognition or other text matching method. If other devices connect to the Living Room Set Top Box, such as via Bluetooth or other short-range protocol, the computing device may determine that those devices are also in the living room. The signal strength of such connections may also be used to determine the location of those other devices.

Alternatively, the awareness server 412 (see FIG. 4) might already know the topology (e.g., layout) of the user's home 373, including that the user's home 373 has a living room, kitchen, kids playroom, media room, bedroom, and deck/porch. For example, the user may have provided the awareness server 412 with the topology of the user's home 373 when the user registered for services, such as mobile phone services, internet services, content services, etc. Alternatively, the topology of the user's home 373 may be pulled from public records for structures such as if the user has made the topology or blueprint of the user's home 373 public and available through a title company. The awareness server 412, however, might not know which devices are in each room. The awareness server 412 may send a list of rooms in the user's home 373 to the user's mobile device, and the mobile device may prompt the user to identify devices in each of the rooms. For example, the mobile device may display "Living Room." The user may input a device identifier for a Bluetooth Device, such as the name "Living Room Bluetooth Speakers." Alternatively, the mobile device may pair with the Living Room Bluetooth Speakers and automatically send an identifier for the speakers to the awareness server 412. After receiving the information, the awareness server 412 may correlate the Living Room with the Living Room Bluetooth Speakers. Information identifying a Bluetooth device in the kitchen, a Bluetooth device in the kid's playroom, a Bluetooth device in the media room, and a Bluetooth device in the bedroom may be provided to the awareness server 412 in a similar manner as the Bluetooth device in the living room.

Instead of the user's mobile device sending the information to the awareness server 412, a different device, such as a fixed device 406 or any other device that can communicate with the awareness server, may provide the location and/or device information. For example, the user may utilize the input/output capabilities of a display device (e.g., a television) and/or a gateway device (e.g., a set-top box or router) to provide location and/or device information to the awareness server 412. When the awareness server 412 receives the location or device information, it can store the information in the user's profile.

Returning to FIG. 5, in step 530, the computing device may determine groups, such as permission groups, that the user belongs to or should belong to. The computing device may generate a new permission group with the user as a member. Alternatively, the computing device may add the user to an already-existing permission group. As previously discussed, a primary user and secondary users in a content service account or mobile telephone service account may be included in the same group. For example, the group may include all members on the same mobile service account (e.g., all family members on a family plan). A user, such as the primary user, may have the authority to add other users to the group. Alternatively, each user of the group may have the authority to add other users to the group. In some aspects, the location service provider, content service provider, mobile phone service provider, or any other service provider associated with the users and/or groups might have to give permission to the user to add additional users to the group. Certain actions to be automatically performed when a user of a group moves inside and outside of a geofence may be set up, based on input made by the primary user of the group.

Each user may also have one or more devices, such as mobile devices 606 illustrated in FIG. 6. Each user's devices may be mapped to one or more telephone number 604 and/or service account identifier 602. By binding devices to one another and/or to telephone numbers or service account identifiers, authentication and content access permissions may be established for devices in the group. Each separate user device may result in a specific action associated being performed, based on the location of the particular user device within the geofence environment. For example, user device #1 having moved within an inner geofence region may result in the opening of a garage door in the user's home, whereas user device #2 having moved within the inner geofence region may result in the turning on of an HVAC system in the user's home. Each user group may have different actions to be performed based on where a user of the user group is located within a geofence environment, as compared to other users of other user groups located in the same region.

The user's device, such as a mobile phone, may be used to authenticate the user, such as for services and/or products. For example, the user may seamlessly sign on for services and/or products (e.g., to access content items, to access mobile phone services, etc.) using his or her mobile phone. In other words, the phone may act as a mobile wallet or passport for signing in the user for any products and services associated with the user's or user device's identifiers (e.g., the service account identifiers 602, the telephone numbers 604, the device identifiers 606, and the like). By using the device for authentication, the user may be able to access these services and/or products without having to manually authenticate him or herself (e.g., by entering a username and password).

Users within the same group may also be authenticated using their devices. For example, if a user within the group is authenticated for a product or service using the user's device, the other users in the group may be automatically authenticated for the same product or service. Individual and group authentication may also be based on one or more users' locations, as will be described in more detail in the examples below. Authentication of a user or group of users may be used to enable a geofence location determination process to start, according to one or more embodiments described herein. In some embodiments, different levels of authentication may be performed based on the location of users in the geofence environment. For example, if a user is located in the exterior region of the geofence environment 5 miles or farther from the user's home, single factor authentication of the user may be performed (e.g., the user provides a username/password for authentication of the user), whereas if the user moves to a closer region of the geofence environment between 1 and 5 miles from the user's home, multi-factor authentication may be performed (e.g., dual factor authentication in which the user provides a username/password and also a fingerprint identification, for authentication of the user). This may be done because actions that are to be performed when the user is closer to his/her home may be more critical and require further authentication of the user (e.g., unlock the user's front door) as opposed to actions that are to be performed when the user is farther away from his/her home (e.g., turn on the outside lights of the home).

Content access permissions may also be set for an individual user or users in the same content access permission group. For example, if one user is permitted to access particular content, other users in the same group may be permitted to access the same content, without the other users having to be separately authenticated to access the content. Individual and group content access permissions may also be based on one or more users' locations, as will be described in more detail in the examples below.

Returning back to FIG. 5, in step 535, the computing device may determine automated actions to take based on the user's current location. FIG. 8 illustrates example user profiles 800 that correlate users' locations to automated actions according to one or more illustrative aspects of the disclosure. For simplicity, other information stored in the user's profile are not illustrated in FIG. 8. The example profile 800 shows separate profiles for a first user 805 and a second user 810. As previously discussed, the first user 805 and second user 810 may be in the same group, such as a permission group. Inclusion of users in the same group may have implications for authentication and/or content access permissions. Based on the group assigned to a user and the location of the user within a geofence environment, certain actions may automatically be taken (e.g., close window blinds in the user's home, open garage door in the user's home, etc.).

The profile for the first user 805 may correlate a location with one or more automated actions or an automated action with one or more location. The automated actions may relate to access to content and/or home automation. For example, when the first user 805 is in the living room, the set-top box (or television) may switch to a default channel, such as the user's favorite channel. This channel may be identified in the user's profile, for example. Content may also be pushed to the first user's mobile device when the user enters the living room. For example, news information, weather information, and the first user's work emails may be pushed to the first user's mobile device when the first user enters the living room. The first user may also be given full access to streaming content (e.g., via a set-top box, a computer, a television, a tablet computer, a mobile phone, etc.) when he or she is in the living room. For example, the user may be subscribed to a content subscription plan, and the user may be authorized to access all of the content under the subscription plan when the user is in the living room. As will be described in the examples below, the user might not be able to access all of the content under the subscription plan when the user is at a different location such as outside (but within 20 feet of) the user's home 373 within the first additional region 365 of FIG. 3B.

In some embodiments, when the user's battery power is below a threshold level, such as 20% battery power or lower, location determination may default to a low power location determination mode, such as a WiFi location determination mode or a cellular location determination mode, irrespective as to the current location of the user. In some embodiments, a pop-up window may be provided on a display of the user device, in which the user is prompted to change the location determination mode to a lower power mode, or to authorize a particular action that would otherwise automatically have taken place based on the location of the user within the geofence environment.

In response to the first user 805 entering his or her bedroom, the living room television (or any other device, such as lights) may be automatically turned off. The first user 805 might also have full access to streaming content while in the bedroom. A home security system at the user's premise may also be automatically set when the first user 805 enters the bedroom. For example, the motion detectors may be activated (or otherwise turned on) when the first user enters his or her bedroom.

When the first user 805 enters his or her deck or porch, the lights in the user's home 373 may be automatically turned off. As will be discussed in further detail in the examples below, the user's specific location within the user's home 373 may be determined using one or more Bluetooth or WiFi devices or other protocols of short or medium range.

Automated actions may be taken when the user is outside the inner geofence 357 but inside the middle geofence 359 of the geofence environment 355. For example, when the user is within one hundred (100) feet of the user's home 373 and is located in the geofence region 365 as shown in FIG. 3B, the user's set-top box and television may be turned on. Furthermore, when the user is within 100 feet of the user's home 373 and located in the geofence region 365 as shown in FIG. 3B, the user might be given limited access to streaming content. For example, the user might be given access to a subset of the streaming content that the user can access when the user is in the region 363 that is within the inner geofence 357 but outside the user's home 373. In some embodiments, based on the amount of battery power of the user's mobile device and the location of the user's mobile device within the geofence environment, certain actions may be restricted, such as an action to stream video content to the user's mobile device when the user is within 100 feet of the user's home 373, so as to not deplete the remaining amount of battery power of the user's mobile device.

When the user is outside the middle geofence 359 but inside the outer geofence 361 of the geofence environment 355, such as located two (2) miles from the user's home 373 and within the geofence region 367 as shown in FIG. 3B, content may be pushed to the user's mobile device. Alternatively or additionally, the content may be pushed to mobile devices associated with other users in the same group as the user 805, such as a second user's mobile device. The content may comprise, for example, an advertisement, a message indicating that the user is within 2 miles of the user's home 373, or any other content. The user may also be given limited access to streaming content when the user is outside the middle geofence 359 but inside the outer geofence 361 (e.g., located three (3) miles from the user's home 373). Alternatively, the user 805 may be provided with a notification on his or her mobile device as to whether or not to cause the pushing of content to other users in the group as the user 805 when the user enters the geofence region 367.

When the user is outside the middle geofence 359 but inside the outer geofence 361 of the geofence environment 355 and thus within the geofence region 367 as shown in FIG. 3B, the temperature at the user's home 373 may be adjusted via a thermostat in the user's home 373. For example, the temperature may be increased (e.g., by turning on the heating system or turning off the air conditioning system) or decreased (e.g., by turning on the air conditioning system or turning off the heating system), based on the user's preferences stored in the profile. Alternatively, the user may be provided with a notification on his or her mobile device as to whether or not to adjust the temperature at the user's home 373 when the user enters the geofence region 367 from the region 369 outside of the outer geofence 361.

When the user is at another location, such as a store located within another geofence environment separate the geofence environment 355 as shown in FIG. 3B, the computing device may permit a third party to send content, such as advertisements, coupons, and other content, to the first user's mobile device. For example, a coupon for a product or service may be sent to the user when he or she enters the store.

Referring back to FIG. 8, the second user 810 may also have a profile correlating locations with actions (e.g., content actions and/or home automation actions). If the second user 810 is in the living room of the user's home 373, the set-top box and the display device (e.g., a television) in the living room may be turned on, a custom interface for the second user 810 may be pushed to or displayed on the remote control for the set-top box or television, and a content recommendation for the second user 810 may be generated and/or displayed on the television or display device in the living room or on the user's mobile device. The actions to be performed based on the location of the second user 810 in the user's home 373 may cause a display on the device of the second user 810 of the action to be taken, and to request that the second user 810 affirmatively acknowledge acceptance of the action to be taken. If the second user 810 is in the bedroom of the user's home 373, the display device in the bedroom may be turned on automatically and a home security system, such as the motion detectors outside of the bedroom, may be turned on automatically. If the user is outside the user's home 373 (on the deck or porch that is outside the inner geofence 357 and inside the middle geofence 359), such as within the geofence region 365 or the geofence region 367 as shown in FIG. 3B, the lights in the user's home 373 can be turned off automatically, which is the same action that would be performed if the first user 805 goes to the deck just outside the user's home 373.

When the user is within 20 feet of the user's home 373, such as within the geofence region 363 as shown in FIG. 3B, a set-top box in the user's home 373 may be turned off, a television in the living room may be turned off, and the home security system may be set. Alternatively, the home security system at the user's home 373 may be turned off if the user is returning to the user's home 373 from a different location, such as work. The doors to the user's home 373 may also be locked or unlocked. Similarly, the garage door may be opened if the user 810 is arriving at the user's home 373 or closed if the user is leaving the user's home 373.

When the user is within a mile from the user's home 373 and traveling away from the user's home 373, such as being within the geofence region 365 after having crossed to outside of the inner geofence 357, the temperature in the user's home 373 may be adjusted (for example, turned down). Alternatively, when the user is within 5 miles from the user's home 373 and traveling toward the user's home 373, such as being within the geofence region 367 after having crossed to inside of the outer geofence 361, the temperature in the user's home 373 may be adjusted (for example, turned up) Like the first user 805, the second user 810 may be sent content, such as advertisements, by third parties when the second user 810 is at another location, such as a store.

Returning to FIG. 5, in step 540, the computing device may store the user's profile correlating locations with actions (among other information) in, for example, the awareness database 424 illustrated in FIG. 4. As one of ordinary skill in the art would appreciate, profiles may be stored at any location, including within the user's home 373 and/or outside of the user's home 373.

Figure 7:
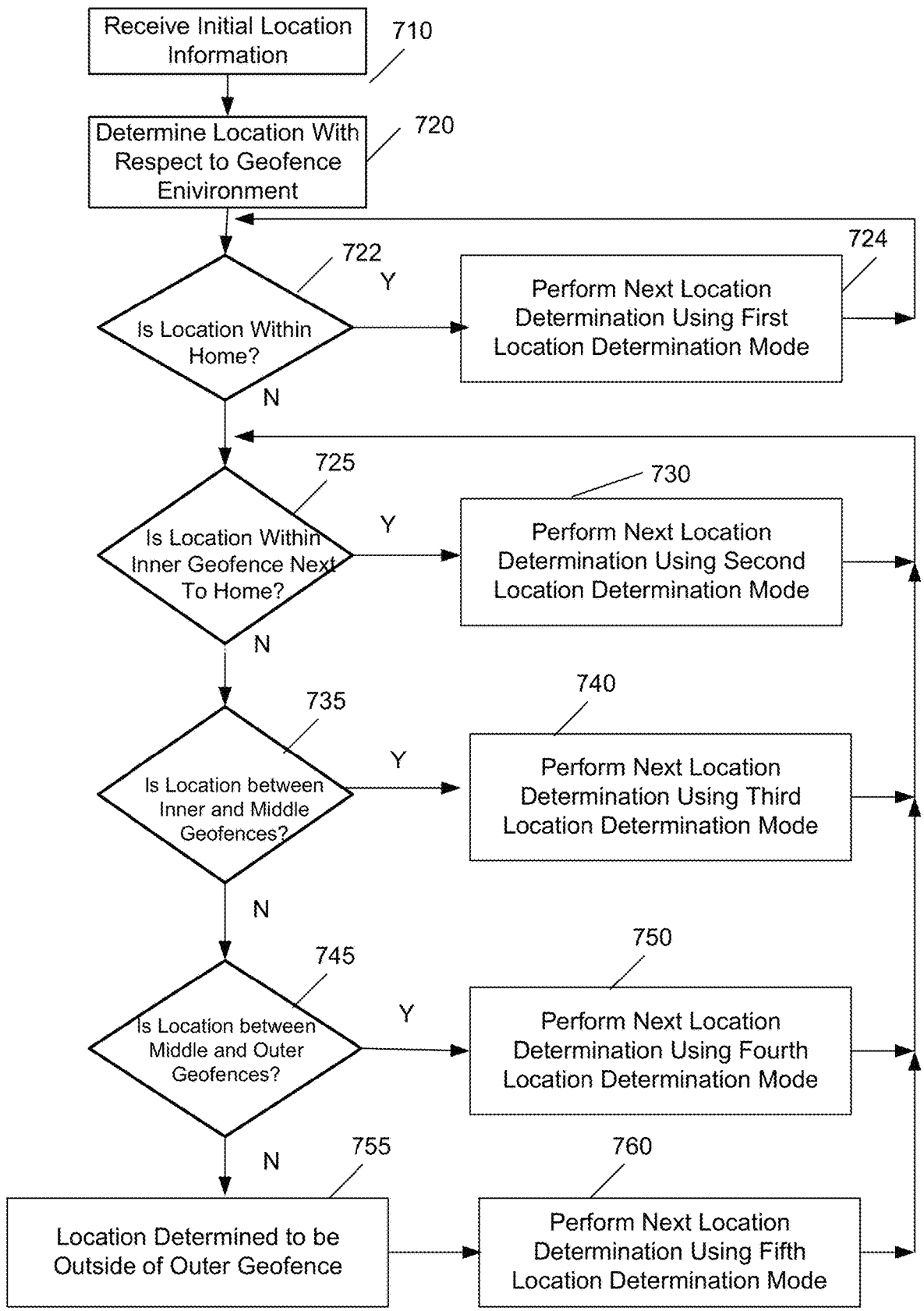
FIG. 7 illustrates an example method of determining a user's location with respect to a geofence environment according to one or more illustrative aspects of the disclosure.

FIG. 7 illustrates an example method of determining a user's location by using a location determination mode that is optimal (in a power utilization sense) for each particular region within a geofence environment according to one or more illustrative aspects of the disclosure. In some aspects, the user's current location may be determined using one of a plurality of different location determination modes, where the location determination mode to use is chosen based on the most recently computed location of the user. As will be discussed in the examples below, a computing device may attempt to determine the user's current location using first information dependent upon a most recent determination as to the user's location, in which the first information is provided by way of polling cell towers of a cellular network to determine the user's location when the user was last determined to be outside of an outermost geofence of a multi-fence geofence environment (e.g., which cell of a cellular network is the user located). This may result in low battery drain of the user's mobile device, and may correspond to a low power consumption, low accuracy location determination mode (e.g., a location determination savings mode) that may be used when the user's mobile device is far away from the user's home. That way, battery life of the user's mobile device may be prolonged and not used up quickly as compared to other types of location determination modes. The low power is a result of the user's mobile device not having to send out any signals for determining position, beyond the standard process of the user's mobile device receiving signals from in-range cell towers of a cellular network to connect to the cellular network in a normal operation mode of the mobile device. The low power consumption, low accuracy location determination mode may not be as accurate as other modes, such as polling for signals output by a global positioning system (GPS) or a home-based WiFi network or a community-based WiFi network (e.g., Wi-Fi available across a Wide Area Network) to determine a user's location. This is not generally a concern, since when the user is outside of the outermost geofence, he/she is far away from his/her home and thus precise location of the user is generally not necessary. GPS location modes typically provide accuracy to within 100 feet, whereby a cellular location mode may only provide accuracy to within 1-2 miles (e.g., provide information as to which cell of a cellular network the user is located in). However, GPS location modes require more power consumption than cellular location modes and WiFi location modes, and thus there is a tradeoff of location accuracy versus power consumption. A GPS location determination mode provides precise location determination, and is not based on a network connection to a local cellular network or a WiFi network. As such, GPS location determination takes up more power than a WiFi location determination mode or a cellular location determination mode that piggy-back on network connection signals (e.g., beacons) that are used to connect to a local WiFi or a local cellular network.

A GPS location determination mode that polls for GPS signals to determine the location of a user's mobile device may be performed by the mobile device receiving signals from a GPS system of 24 satellites based on a polling of the GPS system by the user's mobile device, in which the received signals include very accurate time-of-day time stamp information corresponding to the exact time when the GPS signal was transmitted by the satellite. The time-of-day time stamp information is accurate enough so that the mobile device may calculate how far away a given satellite is by comparing the time the signal is received from the satellite and the time stamp information included in the received signal. Very precise accuracy may be obtained using GPS information (e.g., up to a few meters accuracy when GPS polling rate is once per second, or in the 'tens of meters' accuracy when GPS polling rate is once per minute assuming the mobile device is moving at a certain speed such as 10 miles per hour), but whereby GPS location determination typically uses more mobile device resources and thus has a greater burden on a mobile device battery as compared to WiFi location determination and cell tower location determination.

A cellular location determination mode that polls for cell tower signals to determine the location of a user's mobile device may be performed by the mobile phone periodically notifying local cell towers of its presence so that phone calls can be routed to the mobile device. This results in a very low burden on the mobile device's battery, but also provides a fairly inaccurate location determination of the mobile device, such as determining that the mobile device is located somewhere within a 5 mile diameter cell region. However, in cases where the mobile device can receive cell tower signals from more than one cell tower, such as a first cell tower and a second cell tower, then location determination may be more precise (e.g., 1/10 mile accuracy) since the location of the mobile device would then correspond to the intersection of first and second cells respectively associated with the first and second cell towers.

A WiFi location determination mode that uses WiFi signals to determine the location of a user's mobile device may be performed by the mobile device listening for signals output by all WiFi networks within an area and determining a signal strength of the received signals. Based on location information of the access points associated with the WiFi networks for which signals are received by the mobile device and their accompanying signal strength, a fairly precise location of the mobile device may be obtained, such as in the tens of meters with not much burden on power consumption of the mobile device. For example, the location of each WiFi access point in a network may be stored in a database, based on a physical address of a user associated with the WiFi access point (e.g., a billing address of the user associated with the WiFi access point), and based on the Internet Protocol (IP) address of the WiFi access point that associates a particular user to a particular WiFi access point.

In step 710, initial location information of a user device is received by a computing device, which may be the user device itself in some embodiments, or a server on a WAN or LAN working together with the user device to determine a location of the user device in the geofence environment in other embodiments. By way of example, the user device, when first powered on, uses the most accurate location determination scheme that it can support for determining its current location. The most accurate location determination scheme may be WiFi or GPS-based or Bluetooth-based, whereby a GPS-based location determination scheme may result in the highest drain of the computing device's battery as compared to other location determination schemes. By way of example, the mobile device may first attempt to poll for a Bluetooth signal, and if one is not found, attempt to poll for a WiFi signal, and if one is not found, turn a GPS application ON to attempt to poll for a GPS signal. In some embodiments, a hierarchy for performing initial location determination of the user device may be to first try to determine location using GPS signals, and if that fails (e.g., user device is in a location that cannot receive GPS signals) to then try to determine location using WiFi signals, and if that fails (e.g., user device is in a location that cannot receive WiFi signals) to then try to determine location using cellular signals. Additionally, Bluetooth signaling may be used to determine a location of the user device, such as when initial location determination has failed using GPS, WiFi and cellular.

In step 720, based on the initial location information of the user device, a location of the user device with respect to a geofence environment is determined. For example, the location of the user device with respect to the geofence environment as shown in FIG. 3B is determined. The geofence environment may have been set up beforehand using the user interface displays as shown in FIGS. 9A and 9B, for example.

Based on the determination of where the user device is located with respect to a geofence environment that is made in step 720, a determination is made in step 722 as to whether the user device is currently located within the user's home. If the user device is determined to be currently located within the user's home (e.g., region 373 in FIG. 3B), then in step 724 a low power consumption location determination mode may be used as a first location determination mode, since the user is typically likely to stay in the user's home for some amount of time (e.g., an hour or more after having arrived at home), and having a higher power consumption location determination mode may result in the user having to recharge his or her device fairly frequently or turn the user device off due to battery power level being at a low level, which is undesirable. For example, a GPS location determination mode having an update or polling rate of once every 20 minutes may be used.

If the result of the determination in step 722 is No, then in step 725, a determination is made as to whether the user device is currently located in a geofence region (e.g., region 363 in FIG. 3B) adjacent to the user's home. If the result of the determination in step 725 is Yes, then in step 730, a next location determination of the user device is performed based on a second location determination mode. The next location determination of the user device may be performed a predetermined amount of time after the current location of the user device is determined. For example, a GPS update or polling rate of once per minute may be used, wherein the predetermined amount of time corresponds to one minute.

If the result of the determination in step 725 is No, then in step 735, a determination is made as to whether the user device is currently located in a geofence region (e.g., region 365 in FIG. 3B) between the inner geofence and the middle geofence. If the result of the determination in step 735 is Yes, then in step 740, a next location determination of the user device is performed based on a third location determination mode different from the first and second location determination modes. The next location determination of the user device may be performed a predetermined amount of time after the current location of the user device is determined. In some embodiments, the second location determination mode may correspond to a faster polling rate using the same location determination signals (e.g., GPS signals) as the third location determination mode.

If the result of the determination in step 735 is No, then in step 745, a determination is made as to whether the user device is currently located in a geofence region (e.g., region 367 in FIG. 3B) between the middle geofence and the outer geofence. If the result of the determination in step 745 is Yes, then in step 750, a next location determination of the user device is performed based on a fourth location determination mode different from the first, second and third location determination modes. The next location determination of the user device may be performed a predetermined amount of time after the current location of the user device is determined. In some embodiments, the third location determination mode may correspond to a faster polling rate using the same location determination signals (e.g., GPS signals) as the fourth location determination mode.

If the result of the determination in step 735 is Yes, then in step 755 the user device is determined to be currently located in the outer geofence region (e.g., region 369 in FIG.

3B) outside of the outer geofence, and in step 760 a next location determination of the user device is performed based on a fifth location determination mode different from the first, second, third and fourth location determination modes. The next location determination of the user device may be performed a predetermined amount of time after the current location of the user device is determined. In some embodiments, the fifth location determination mode may correspond to a mode that uses cellular signals to determine location of a mobile device, whereby the fourth location determination mode may correspond to a mode that uses some type of other location determination signals (e.g., GPS signals, or WiFi signals).

After the next location determination is performed in steps 724, 730, 740, 750 and 760, the process returns to step 722 to determine the current location of the user device based on the most recent location information obtained since the last time the location of the user device was determined.

Since the user device is closer to his/her home when located in the region 363 as compared to when the user device is located in the region 365, there is a desire to more accurately and more quickly determine where the user device is currently located, since typically more actions (e.g., opening of garage door, unlock front door) with respect to the home 373 are performed when the user device is located in the region 363 as compared to when the user device is located in the region 365 (turn ON home HVAC system). To this end, the second location determination mode performed when the user device is located in the region 363 outside the home 373 but inside the inner geofence 357 may be more accurate than the third location determination mode performed when the user device is located between the inner geofence 357 and the middle geofence 359, and may utilize more battery power than the third location determination mode. Also, since the region 363 next to the home 373 is typically a fairly small-sized region in which the user does not typically stay within very long, it is desirable to update the location determination of the user device fairly quickly, to determine if the user device has gone into the home 373 or into an area (e.g., region 365) farther away from the home 373. Thus, the fairly large power consumption used by the user device to perform location determination when in the region 363 is justified.

Since the user device is closer to his/her home 373 when located in the region 365 as compared to when the user device is located in the region 367, there is a desire to more accurately and more quickly determine where the user device is currently located, since typically more actions with respect to the home 373 (e.g., turn inside lights ON/OFF, turn HVAC ON/OFF) are performed the closer the user gets to his/her home 373. To this end, the third location determination performed when the user device is located between the inner geofence 357 and the middle geofence 359 may be more accurate than the fourth location determination performed when the user device is located between the middle geofence 359 and the outer geofence 361, whereby the third location determination mode may utilize more battery power of the user device than the fourth location determination mode. Also, since the region 365 is larger than the region 363 and smaller than the region 367, it is desirable to update location determination of the user device at a rate appropriate for the size of the region 365, to determine if the user device has gone into the region 363 closer to the home 373 or into the region 367 farther away from the home 373. Thus, the intermediate amount of power consumption used by the user device to perform location determination when in the region 365 is justified.

By way of example, the third location determination mode may perform a polling operation of a GPS system at a faster rate than the fourth location determination mode, whereby each separate polling of the GPS system takes up an amount of battery power of the user device. Also, by way of example, a location determination utilizing GPS typically takes up more battery resources than a location determination using a WiFi network or a cellular network (since location determination using a WiFi network or a cellular network is typically performed at all times when a user device is turned ON). The fourth location determination may be more accurate than the fifth location determination mode, and may utilize more battery power of the user device than the fifth location determination mode. The fifth location determination mode is performed when the user device is located outside of the outer geofence 361, whereby few if any actions with respect to the user's home 373 may occur when the user device is located in the region 369 outside of the outer geofence 361, and thus precise location determination of the user device is not an important consideration when the user device is far away from the home 373. As such, a low battery power cellular location determination mode is an appropriate choice as the fifth location determination mode when the user device is located in the region 369.

The fifth location determination mode used to determine location of the user device when in the region 369 may correspond to a location mode using cellular network signals (e.g., signals output by cell towers of a cellular network) that uses relatively low battery resources of the mobile device. The fourth location determination mode may correspond to a location mode using GPS signals at a first polling rate, the third location determination mode may correspond to a location mode using GPS signals at a second polling rate faster than the first polling rate, whereby the third location determination mode uses more battery resources as compared to the fourth location determination mode. The second location determination mode may correspond to a location mode using WiFi signals of a WiFi network, or GPS signals at a faster polling rate than what is used in the third location determination mode, whereby the second location determination mode uses more battery resources as compared to the third location determination mode. The first location determination mode may correspond to a location determination mode that uses very low battery resources of the mobile device (e.g., lower than any of the other location determination modes). For example, the first location determination mode may correspond to a GPS location determination mode in which the polling rate is very slow, such as every 10-20 minutes.

In some aspects, the user's mobile device receiving signals from a home Wi-Fi network may be used to determine whether the user is within or very close to the user's home 373. For example, in response to a determination that the location of the user device using a Wi-Fi network at the user's home 373 (e.g., that the user is connected to the home Wi-Fi network), the computing device may determine that the user device is within a predetermined distance from the user's home 373 (e.g., the range of the Wi-Fi network). If the user's home 373 has more than one communications network (e.g., a first WiFi network and a second WiFi network), each network may be used to determine the user's distance from the user's home 373. For example, the user's home 373 may have a Wi-Fi network and a WiMAX network. When the user device connects to (or is able to detect) the WiMAX network, the computing device may determine that the user is within a first predetermined distance (e.g., radius) from the user's home 373 (e.g., the user is within 1000 feet of the user's home for a WiMAX network having a range of 1000 feet), as used as a trigger when the user enters the region 365 inside of the outer geofence 361 but outside of the middle geofence 359. When the user device connects to (or is able to connect to) the Wi-Fi network, the computing device may determine that the user is within a second predetermined distance (e.g., radius) from the user's home 373 (e.g., 100 feet, as used as a trigger when the user enters the geofence region 363 that is inside of the inner geofence 357 but outside of the user's home 373). These distances may vary based on the range of each network. The medium-range wireless networks are not limited to home networks and can include, for example, a Wi-Fi network at a third party location, such as a coffee shop or department store. The Wi-Fi network at the coffee shop may also be associated with the provider of the location services, streamlining location determination. In some aspects, the computing device may alternatively use both first location information (e.g., Bluetooth information) and second location information (e.g., Wi-Fi information) in combination to determine the user's location.

In some embodiments, the computing device may sequentially use each type of information until the user's location is determined, based on selection of a location determination mode from a predetermined hierarchy of candidate location determination modes set for the particular geofence region that the computing device was most recently determined to be located. Alternatively, the computing device may use a combination of the information (e.g., information from both a GPS network and a WiFi network) to determine the user's location when the mobile device is within either the geofence region 363, the geofence region 365, or the geofence region 367. The method may be performed by any of the computing devices described herein, including cloud computing devices, computing devices at the local office 103, computing devices within the location 102, and/or mobile computing devices (e.g., a mobile phone) of FIG. 1.

In some embodiments, when the computing device is determined to be located either inside of the inner geofence 357 or located outside of the inner geofence 357 but inside of the middle geofence 359, the location determination scheme may be performed with high accuracy (e.g., accuracy to within 50 feet) but with relatively high amount power drain on a mobile device's battery, such as high polling rate GPS-based location determination scheme (e.g., location determined based on receiving GPS signals once every five seconds), or by using a lower-power-consumption WiFi location determination scheme if available in that location. If instead the computing device is determined to be located outside of the middle geofence 359 but inside of the outer geofence 361, the location determination scheme may be performed with moderate accuracy (e.g., accuracy from between 100 feet to 200 feet) but with relatively moderate amount of power drain on the mobile device's battery such a low polling rate GPS-based location determination scheme (e.g., location determined based on receiving GPS signals once per minute), or by using a lower-power-consumption WiFi location determination scheme if available in that location. If instead the computing device is determined to be located outside of the outer geofence 361, the location determination scheme may be performed with low accuracy (e.g., 1 to 5 miles accuracy) but with relatively low amount power drain on the mobile device's battery such a cell tower location determination scheme or WiFi if available. This low location accuracy may not raise a concern when the computing device is outside of the outer geofence 361, since the computing device would be located fairly far away from the user's home 373 that is located within the inner geofence 357, in which precise location determination of the mobile device is not as important as it would be when the mobile is close to the user's home 373 or within the user's home 373.

In some embodiments, when the computing device enters the geofence region 363 located within the inner geofence 357 but outside of the user's home 373, this may result in a first triggering event, which may cause the turning on of one or more home appliances such as air conditioning and/or a television set. When the computing device leaves the region 363 and travels outside of the inner geofence 357 and thus into the geofence region 365, this may result in a second triggering event, which may cause the turning off of the one or more home appliances and/or the closing of shades on windows of the user's home 373.

Various triggering events that may occur according to one or more embodiments are provided in the table below.

| Location | Action |
| --- | --- |
| User leaves home (e.g., mobile phone disconnects from home Wi-Fi network), in which user moves from geofence region 363 to geofence region 365 | Send instruction to gateway device (or other network device) to make the user's home network visible in the Cloud, allowing the user to access content on the home network (e.g., documents, movies, music, etc.) and/or save, on the home network, pictures or movies taken from user's mobile phone |
| User leaves home (e.g., mobile phone disconnects from home Wi-Fi network), in which user moves from geofence region 363 to geofence region 365 | Send instruction to update user's call forwarding preferences to forward calls made to home telephone(s) to user's cell phone; send instruction to disable caller ID on STB |
| User enters home (e.g., mobile phone connects to home Wi-Fi network), in which user moves from geofence region 365 to geofence region 363 | Send instruction to update user's call forwarding preferences to disable call forwarding; send instruction to enable caller ID on STB |
| User is in front of display device (e.g., in living room), within a first geofence subregion within the geofence region 363 | Send instruction to gateway or STB to generate and/or display personalized content recommendation for user based on content marked as favorites, recently watched content, accessibility settings, and/or other factors |
| User was previously at a retail location or other store within a | Send instruction to a home gateway, STB, or display device to display an advertisement for a product or |

| Location | Action |
| --- | --- |
| separate geofence region and is currently at home within the geofence region 363 | service of the store that user visited (e.g., a J.CREW coupon or advertisement) |
| User is outside of the geofence region 367 and time is late (e.g., past 11 pm) | Send message to user's mobile device for user to call home |
| User is outside of geofence region 367 and temperature in home area/neighborhood is below freezing (based on weather information retrieved from network location, such as weather website) | Send instruction to thermostat in home or other smart home device to turn temperature in home up to a predetermined temperature (e.g., 68 degrees) |
| A preferred sports team is playing or a favorite television show or movie is airing (e.g., stored in user's content preferences), and user is outside the home (outside of geofence region 363) | Send instruction for content recording device, such as DVR, to record the program and/or send an alert to user's mobile device that favorite program has started or is about to start (e.g., 5 minutes before start time) |

In some embodiments, the location determination may be performed by a position location application on the user's mobile device that is running in a background mode, in which the location determined by the application may be reported to a geofence system provided on a server accessible via the Internet, a WAN or a LAN. Based on the determined location of the mobile device, the geofence system determines where the user's mobile device is positioned with respect to the inner geofence 357, the middle geofence 359, and the outer geofence 361, and instructs the position location application on the user's mobile device as to which type of location determination to use as described in detail above.

In some embodiments, the user selects the geofence regions by way of a user interface display. The user may select precise latitude and longitude coordinates for each of a plurality of geofences, such as concentric geofences centered around the user's home 373. The user may further select one more triggering events when the user enters and exits each geofence region. FIG. 9A shows a user interface display 910 that may be used by a user to select and define geofence regions, according to one or more embodiments. FIG. 9B shows an alternative user interface display 991 that allows a user to select geofences on a map that includes a location of his/her home 992, whereby the user has selected an inner geofence 993 and an outer geofence 994 that are centered around the user's home 992. FIG. 9C shows yet another alternative user interface display 991 that corresponds to a map of a region where a user seeks to create a geofence environment around his/her home 992.

In some embodiments, the geofence system may monitor the amount of time the user dwells in each geofence region over a period of time such as a two-week or three-week period, and the location determination scheme for one or more of the geofence regions may be dynamically adjusted based on such information. By way of example, if the user is determined to be located within the geofence region 367 for more than two hours a day, the location determination scheme for the geofence region 367 may be changed from a moderate-power-consumption, moderate location accuracy scheme to a lower-power-consumption, lower location accuracy scheme to save on battery drain when the user is in that geofence subregion. By way of example, the location determination scheme may be dynamically changed from a GPS polling rate of once every five seconds to a GPS polling rate of once every minute. In some embodiments, when the current battery capacity of the user's mobile device drops below a predetermined threshold, such as below 20% full capacity, the location position scheme may be automatically changed to the lowest power consumption location determination mode (e.g., using signals from cell towers to determine location of mobile device), irrespective as to the current location of the mobile device.

Figure 10:
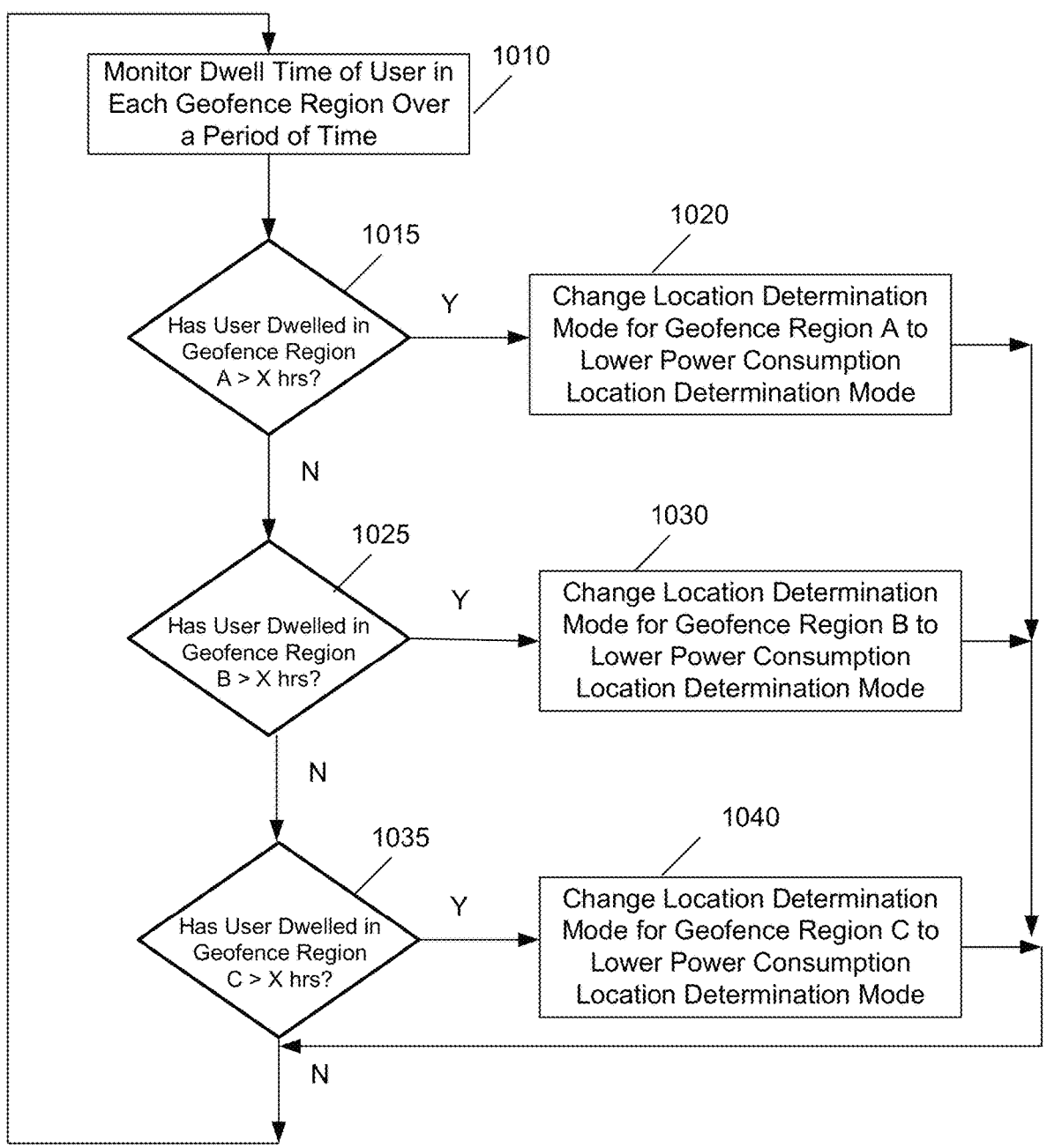
FIG. 10 illustrates an example method of changing location determination modes with respect to geofence regions in a geofence environment according to one or more illustrative aspects of the disclosure.

FIG. 10 illustrates an example method of dynamically adjusting one or more geofence regions according to one or more illustrative aspects of the disclosure, in which the geofence environment comprises three separate geofence regions A, B and C. For example, referring now to FIG. 3B, geofence regions A, B and C may correspond to regions 363, 365 and 367. In step 1010, the dwell time of the user in each geofence region is monitored over a period of time. In step 1015, a determination is made as to whether or not the user has dwelled in geofence region A for at least X hours over than a predetermined period of time (e.g., has the user dwelled in region 363 in FIG. 3B for more than two hours over the last two week period). If Yes, then in step 1020 the location determination mode is changed to the next lower consumption location determination mode. For example, if the current location determination mode for region 363 is to use GPS signals at a polling rate of once every 5 minutes, then the location determination mode for region 363 is changed to use GPS signals at a polling rate of once every 10 minutes. Each polling operation performed by the user device, in which the user device searches for and acquires a GPS signal from one or more GPS satellites and in which the user device then determines a location of the user device based on the just-received GPS signals, takes up a certain amount of battery resources of the user device, whereby a slower GPS polling rate uses up less battery resources than a faster GPS polling rate over a same time period in which GPS polling is performed (e.g., for a 10 minute time period, a 'once per minute' GPS polling corresponds to 10 separate GPS polling and location determination operations, whereas a 'once per 30 seconds' GPS polling corresponds to 20 separate GPS polling and location determination operations that take up more battery resources due to the 10 extra GPS pollings and location determinations performed by the user device during the same 10 minute time period).

In step 1025, a determination is made as to whether or not the user has dwelled in geofence region B for at least X hours over than a predetermined period of time (e.g., has the user dwelled in region 365 in FIG. 3B for more than two hours over the last two week period). If Yes, then in step 1030 the location determination mode is changed to the next lower consumption location determination mode. For example, if the current location determination mode for region 365 is to use GPS signals at a polling rate of once every 10 minutes, then the location determination mode for region 365 is changed to use GPS signals at an update rate of every 15 minutes.

In step 1035, a determination is made as to whether or not the user has dwelled in geofence region C for at least X hours over than a predetermined period of time (e.g., has the user dwelled in region 367 in FIG. 3B for more than two hours over the last two week period). If Yes, then in step 1040 the location determination mode is changed to the next lower consumption location determination mode. For example, if the current location determination mode for region 367 is to use GPS signals at a polling rate of once every 15 minutes, then the location determination mode for region 367 is changed to use GPS signals at an update rate of every 20 minutes.

After step 1035 and step 1040, the process returns to step 1010 to continue monitoring dwell time of the user in the geofence environment (e.g., dwell time monitoring statistics gathered once per day to determine whether or not any location determination modes in the geofence regions are to be changed).

In some embodiments, the choice of which location determination mode to use based on a user's current location in a geofence environment may be initially set by default parameters, such as the scheme described above, whereby the user may modify the location determination schemes for one or more of the geofence regions. This may be accomplished by way of a user interface to a geofence system on the Internet accessible via a web browser of the user's mobile device, in which the user may set any particular location determination mode for each geofence region or sub-region in the geofence structure created by the user.

In some embodiments, based on the speed of movement of the user based on comparison of location determination values obtained consecutively over a period of time, the location determination mode may be changed accordingly. For example, as described above with respect to an embodiment, when the computing device is determined to be located outside of the middle geofence 359 but inside of the outer geofence 361 of FIG. 3B, the location determination mode may be performed with moderate accuracy (e.g., accuracy from between 100 feet to 200 feet) but with relatively moderate amount of power drain on the mobile device's battery such a low polling rate GPS-based location determination scheme based on receiving WiFi or GPS signals at a predetermined rate. In this instance, when the mobile device is determined to be moving at a rate of 25 miles per hour or greater, the location determination may be performed by way of GPS signals received by the mobile device (since WiFi is not typically capable of providing location determination for a device traveling at such a rate of speed), and when the mobile device is determined to be moving at a rate of less than 25 miles per hour, the location determination may be performed by way of WiFi signals received by the mobile device (since WiFi location determination modes typically causes less power drain than GPS location determination modes).

In some embodiments, based on the computation of the current location of the mobile device with respect to the geofence environment, the mobile device may use a different location determination mode when the mobile device is determined to have moved from one geofence region to another geofence region.

In some embodiments, based on a general location of the geofence environment, such as being within a city or in a suburban location or in a rural location, the geofences may be preset based on default parameters associated with a city geofence, a suburban geofence or a rural geofence. By way of example, and referring back to FIG. 3B and also to FIG. 9C, when the geofence environment 355 is located in a city (e.g., based on referring to a database equating zip codes with city, suburban or rural regions) and the geofence environment comprises an inner geofence 357, a middle geofence 359 and an outer geofence 361, the distances of the middle geofence 359 and the outer geofence 361 with respect to the inner geofence 357 may be set shorter than their respective distances when the geofence environment 355 is located in a suburb. In the same manner, when the geofence environment 355 is located in a rural area, the distances of the middle geofence 359 and the outer geofence 361 with respect to the inner geofence 357 may be set larger than their respective distances when the geofence environment 355 is located in a suburb. In such a manner, when the user creates the inner geofence 993 and the outer geofence 994 using the map user interface display 991 of FIG. 9C, the distances of the geofences with respect to the user's home 992 may be set automatically based on whether the user's home 992 is located in an urban, suburban, or rural area. That way, the geofence environment 355 may be set to suit the particular area where it is located, since city environments tend to be more packed together as compared to suburb environments, and suburb environments tend to be more packed together than rural environments, and whereby there may typically be more WiFi networks available to perform location determination using WiFi signals when in a city environment as compared to a suburban environment or a rural environment. For example, the distance from a user's home 373 to a grocery store may be much less when the user's home 373 is in a city as opposed to when the user's home 373 is in a rural area far from a city, and thus the distances typically traveled by a user when in a rural area to go to a grocery store are typically greater than the distances typically traveled by a user to go to a grocery store when located in a city. The preset distances assigned may be modified by a user via a user interface to a geofence system on the Internet, such as by the user accessing the geofence system by entering a particular uniform resource location address (URL) via a browser on the user's mobile device, and then changing the preset geofence distance settings to user-created geofence distance settings. The determination of whether a location is part of a city, suburb or rural area of a region (e.g., a country) may be made, for example, based on reference to a table that equates a particular area with either a city, suburb or rural location based on latest population numbers obtained for the region.

In some embodiments, based on the amount of time that the user has dwelled in one or more of the geofence regions, the geofence system may adjust the size of one or more of the geofence regions to provide more opportunity for energy savings. By way of example, if location data obtained from a mobile device by the geofence system over the past two weeks indicates that the mobile device spends 30% of the time in the geofence region 367 as shown in FIG. 3B, the geofence system may dynamically change the position of the outer geofence 361 from 4 miles away from the inner geofence 357 to 3 miles away from the inner geofence 357, with the desired goal of achieving less battery drain on the mobile device for performing a location determination operation (e.g., turning an antenna ON for a short time period, such as for 1 millisecond every ten seconds, to pick up GPS signals or WiFi signals during that short time period).

FIG. 9A shows an example user interface (UI) display 910 provided on a user's mobile device, to enable the user create a geofence environment according to one or more aspects. The UI 910 may include a latitude entry area 920 and a longitude entry area 930 for the user to enter the latitude and longitude of the user's home 373 of FIG. 3B. Alternatively, the user may enter an address of the user's home 373 in an address entry area 940 of the UI 910. The user may then set the radius of the inner geofence 357 in a geofence region radius setting area 950. The UI 910 may further include a "register geofence" select button 960 and a "remove geofence" select button 970. While FIG. 9A shows concentric circles corresponding to the geofences of a geofence environment, the actual geofence boundaries may be defined at will by a user drawing on a map display (e.g., see FIG. 9C), and need not be concentric circles. For example, the outermost geofence 994 of FIG. 9C may define the outer boundary of a triangular-shaped region instead of a circular region that is shown in that figure.

In some embodiments, based on the radius of the inner geofence 357 entered via the UI 910 by the user, the geofence application may compute an initial radius for the middle geofence 359 and an initial radius for the outer geofence 361. In some embodiments, in a geofence radius initialization mode, once the radius of the inner geofence 357 is set by the user, such as to a value of 300 feet, the initial radius of the middle geofence 359 and the initial radius of the outer geofence 361 may be automatically set based on the following equations:

$$\text{middle geofence radius} = \text{inner geofence radius} + R \text{ miles} \quad (1)$$

$$\text{outer geofence radius} = \text{middle geofence radius} + T \text{ miles} \quad (2)$$

By way of example and not by way of limitation, R may be set equal to a value between 0.2 miles and 1 mile, and T may be set equal to a value between 2 miles and 10 miles.

Once the initial radiuses are computed, the application may optimize these radiuses based on information gathered of a user's time spent at various locations of the geofence environment 355, to obtain a greater amount of power savings for mobile device location determination. In some embodiments, in a geofence radius optimization mode, the radius of the middle geofence 359 and the radius of the outer geofence 361 may be automatically set based on the following equations:

$$\text{middle geofence radius} = \text{expectation of speed} * V \text{ minutes} \quad (3)$$

$$\text{outer geofence radius} = \text{middle geofence radius} + 5 \text{ miles} \quad (4)$$

By way of example and not by way of limitation, V may be set equal to 5 minutes (e.g., V=1/12 hour, where 'expectation of speed' is expressed in miles/hour).

By way of example, if in the past few weeks information is gathered that indicates that the user drives 60 miles per hour going back home 80% of the time and the user drives 40 miles per hour going back home 20% of the time on a Friday, and if today is a Friday, then the outer geofence radius and the outer geofence radius may be optimized to the following values:

$$\text{middle geofence radius} = (60*0.8 + 40*0.2)*5 \text{ minutes} = 4.67 \text{ miles}$$

$$\text{outer geofence radius} = 4.67 \text{ miles} + 5 \text{ miles} = 9.67 \text{ miles}$$

The value of R used in equation (1) may be set equal to 0.5 miles, which may be obtained due to a likely scenario of a user driving at a rate of 35 mph in his or her neighborhood while close to home (typical neighborhood speed limit), to thereby cause a triggering event to occur based on the user crossing the middle geofence 359 about 1 minute or so prior to the user arriving at the user's home 373. The value of T used in equation (2) may be set equal to 5 miles, and may be obtained based on a typical cellular signal tower error range when cellular signals are used to determine a user's location when outside of the outer geofence 361. The value of R in equation (1) and the value of T in equation (2) may be optimized based on typical driving speeds of a user when driving home and the particular cellular network used in the region where the user's home 373 is located. In the above example, 4.67 miles corresponds to a middle geofence radius that a user crosses when about 5 minutes from the user's home 373 while driving, and the 9.67 miles corresponds to an outer radius that a user crosses when about 10 minutes from the user's home 373 while driving. Each of those geofence crossings may result in a particular triggering event to occur at the user's home 373, such as the turning on of a home heating and air conditioning system when the outer geofence 361 is crossed, and the opening of the user's garage door when the middle geofence 359 is crossed.

FIG. 9B shows an example UI display 980 that may be provided to the user on his or her mobile device when in the geofence environment 355, according to one or more aspects. Referring also to FIG. 3B, when the user has entered the geofence region 363 that is outside of the user's home 373, the user may be provided with a notification 985 of such entry into the geofence region 363, and the time when the entry occurred. Similarly, the user may be provided with a notification on the display 980 of entry into other geofence regions, such as entry into the geofence region 365 and entry into the geofence region 367. Still further, user may be provided with a notification on the display of both the geofence region that the user has entered, as well as the geofence region that the user has exited (e.g., 'mobile device has entered the geofence region 367 from the geofence region 369', or 'mobile device has entered the geofence region 367 from the geofence region 365'). The display 980 may also provide notifications as to how the mobile device is connected, such as a notification 990 that the mobile device is connected as a media device, whereby the notification 990 may allow the user to change the connectivity as desired (e.g., connected as a storage device, connected as a pointer device, connected as a digital camera). The notifications may be textual or audible, or both.

FIG. 9C shows an example UI map display 991 that may be used to create a geofence environment that includes an inner geofence 993 and an outer geofence 994 that surround a user's home 992 on First Street.

Referring now to FIG. 3B and FIG. 9A, a user may set the radius of the inner geofence 357 via the UI display 910, which is shown in the example as 500 feet. Based on the user-defined radius of the inner geofence 357, the radius of the middle geofence 359 and the radius of the outer geofence 361 may be determined, as will be described in more detail below.

In some embodiments, as will be described in more detail below, the user's mobile device has three modes of operation: a) an entry mode (where a WiFi location application and a cellular location application on the mobile device are always ON) when the mobile device is moving in a direction toward the home, b) a dwelling mode when the mobile device is within the home, and c) a departure mode when the mobile device is moving in a direction away from the home. For example, with reference to FIG. 7, when the mobile device has been determined to have moved from within the home (Y in step 725) to a location within the inner geofence next to the home (Y in step 725) for two consecutive location determinations, then the mobile device operates in the departure mode. When the mobile device has been determined to have moved from a location between the inner and middle geofences (Y in step 735) to a location within the inner geofence next to the home (Y in step 725) for two consecutive location determinations, then the mobile device operates in the entry mode. And when the mobile device has been determined to be located within the home (Y in step 722), the mobile device operates in the dwelling mode.

In some embodiments, the user's mobile device has WiFi and cellular signaling turned ON at all times while the user's mobile device is ON, since a WiFi location determination mode and a cellular location determination mode utilize much less battery power than a GPS location determination mode and thus may be kept ON without concern about causing major drain on the battery of the user's mobile device.

A description of what types of location determination are performed by a mobile device when the mobile device is located in different regions of a geofence system are described below in detail.

Figure 11:
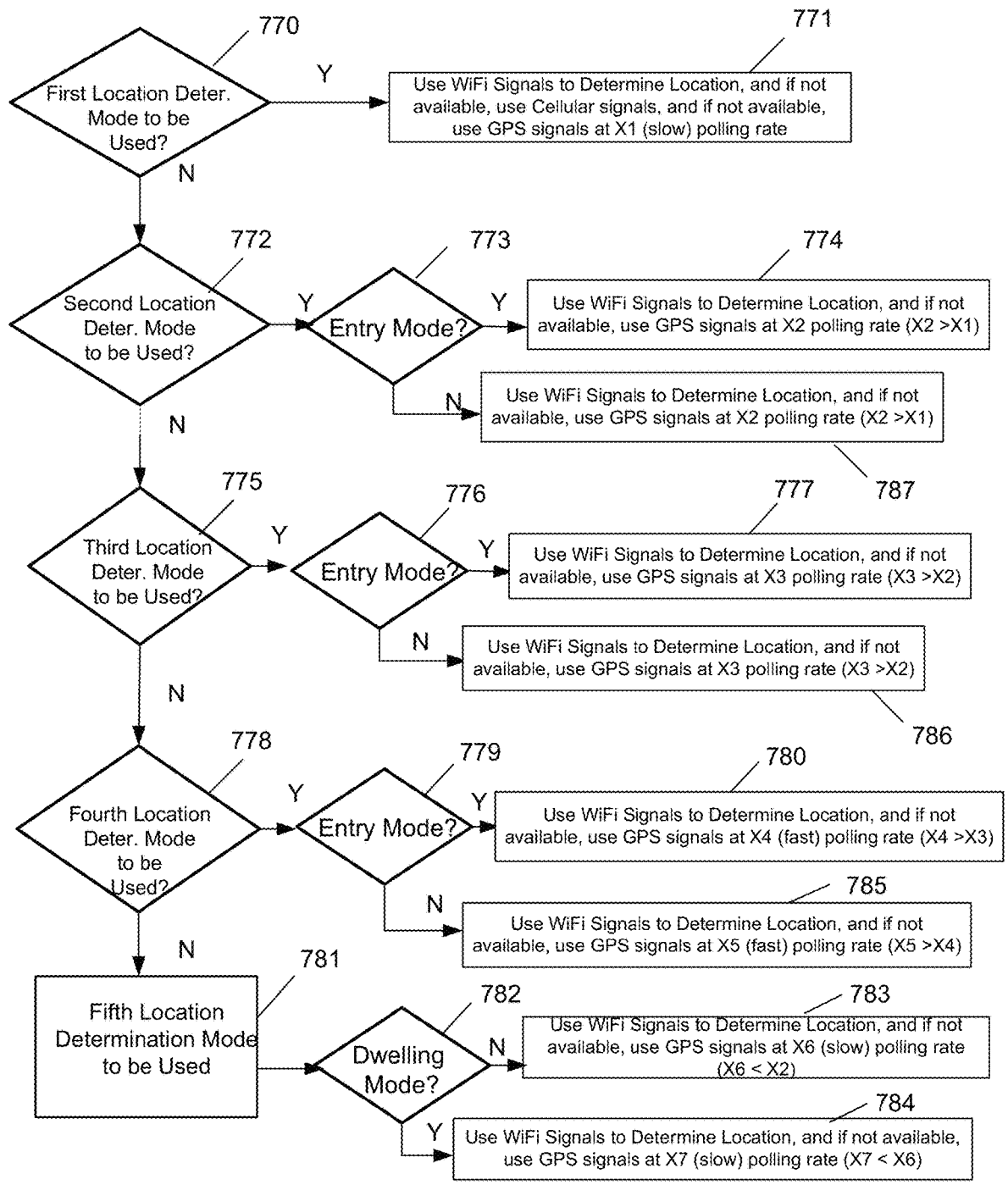
FIG. 11 illustrates an example method of using a particular location determination scheme based on whether a user device is arriving to a user's home within a geofence environment, going away from the user's home, or dwelling within the user's home, according to one or more illustrative aspects of the disclosure.

In some embodiments, with reference to FIG. 3B, FIG. 7 and FIG. 11, when the user device was most recently determined to be located in the outer region 369 a first location determination mode may be used to determine a current location of the user device (Y in step 770 of FIG. 11 and step 760 of FIG. 7), whereby the user device may first attempt to determine its location using WiFi (see step 771 of FIG. 11). If WiFi network signals can be picked up when the mobile device is located in the outer region 369, then that method of determining a current location of the user device may be used, since performing location determination using WiFi network signals consumes relatively low power resources and provides relatively accurate location determination for the user's mobile device. By way of example, the user's mobile device detects the WiFi access points within its network range and their respective signal strengths, and obtains a location of each detected WiFi access point from a WiFi access point location database that may be accessible via a server on the Internet, or via a database stored in a memory of the user's mobile device. The location of a WiFi access point may be the street address of the user who owns the WiFi access point, for example. Based on the location of each detected WiFi access point signal and the corresponding signal strength of each detected signal, an overlapping area of two or more WiFi access point network ranges may be determined as the current location of the user's mobile device. If only one WiFi access point is detected by the mobile device, then the current location of the mobile device may be determined to be the same as the location of the WiFi access point. If no WiFi network signals are detected when the user's mobile device is in the outer region 369, the user's mobile device may determine its location using relatively low accuracy cellular signals output from cell towers (see step 771 of FIG. 11). This typically provides a location of between 1 to 5 miles, but consumes a small amount of battery power of the user's mobile device, making it a good candidate for location determination when the user's mobile device is far away from the user's home 373. If neither cellular nor WiFi signals are available, then GPS signals are used at a slow update rate to determine a current location of the user device (see step 771 of FIG. 11). In some embodiments in which GPS location determination also operates at a very slow polling rate when the user's mobile device was most recently determined to be located in the outer region 369, a combination of WiFi network signals (if available), GPS signals, and cell tower signals may be used to determine a current location of the user's mobile device, whereby this combination may still result in relatively low power drain on the battery of the user's mobile device.

when the user's mobile device enters the region 367 from the outer region 369 as part of the entry mode of operation (Y in step 773 of FIG. 11), and thus moves from outside to inside the outer geofence 361 a second location determination mode may be used (Y in step 772 of FIG. 11 and step 750 of FIG. 7). With reference to step 774 of FIG. 11, the mobile device may first attempt to determine its current location using WiFi, if available, in the same manner as it did when the mobile device was located in the outer region 369. If WiFi is available, then the GPS application on the mobile device may be kept OFF (or kept ON with a very slow polling rate such as 10 to 20 minutes for embodiments in which GPS was ON when the mobile device was in the outer region 369). If WiFi is unavailable in the region 367, then the mobile device may then turn the GPS application ON and attempt to determine its current location using GPS location information obtained from a GPS network of global positioning satellites. When using GPS information while located within the region 367, the mobile device may perform GPS polling at a relatively slow rate, such as a polling rate in a range of from every five (5) minutes to every eight (8) minutes, to lessen the amount of battery power drain of the mobile device. Since the mobile device is located fairly far away from the user's home 373 and thus quick updates of the location of the mobile device are not necessary, the fairly long amount of time between consecutive mobile device location determinations is not a concern.

When the user's mobile device enters the region 365 from the region 367 as part of the entry mode of operation (Y in step 776 of FIG. 11)), and thus moves from outside to inside the middle geofence 359 a third location determination mode may be used (Y in step 775 of FIG. 11 and step 740 of FIG. 7). With reference to step 777 of FIG. 11, the mobile device may first attempt to determine its current location using WiFi, if available, in the same manner as it did when the mobile device was located in the outer-middle region 367. If WiFi is available, the GPS application on the mobile device may be turned ON and operates at a polling rate of between 5 to 8 minutes. If the GPS application was previously ON and operating with a polling rate in a range of from every five (5) minutes to every eight (8) minutes when in the outer-middle region 367, the GPS application may operate with the same polling rate when in the inner-middle region 365.

If WiFi is unavailable in the region 365, the mobile device may then turn the GPS application ON and attempt to determine its current location using GPS location information obtained from a GPS system. When using GPS information while located within the region 365, the mobile device may perform GPS polling at a fast rate, such as in a polling rate in the range of from every five (5) seconds to every ten (10) seconds, which is faster than the polling rate of 5 to 8 minutes when the mobile device was located in the region 367. This is due to the mobile device being located closer to the user's home 373, whereby a more precise location of the mobile device may be calculated to determine when a triggering event or notification is to be made. Also, by having a fast GPS polling rate of every five (5) seconds to every ten (10) seconds, the moment when the user crosses inside the inner geofence 357 may be detected within a few seconds by location determination of the mobile device using GPS signals, and a notification may be sent to the user (e.g., 'you are now inside the geofence) and a triggering event (e.g., garage door opened up) occur as a result of the user crossing inside the inner geofence 357.

When the user's mobile device enters the region 363 from the region 365 as part of the entry mode of operation (Y in step 779 of FIG. 11), and thus moves from outside to inside the inner geofence 357 but still outside of the user's home 373 a fourth location determination mode may be used (Y in step 778 of FIG. 11 and step 730 of FIG. 7). The mobile device may first attempt to determine its current location using WiFi, if available, in the same manner as it did when the mobile device was located in the region 365 and in the region 367. If WiFi is available, the GPS application on the mobile device may be turned OFF (or kept OFF is already OFF). If WiFi is unavailable in the inner region 363, then the mobile device may then turn the GPS application ON and attempt to determine its current location using GPS location information obtained from a GPS system. When using GPS information while located within the inner region 363, the mobile device may perform GPS polling at a fast rate, such as in a polling rate in the range of from every five (5) seconds to every 10 seconds, whereby this fast GPS updating rate may be kept on for up to a predetermined time period, such as for one (1) to two (2) minutes, or until the mobile device is determined to have arrived at the user's home 373, whichever comes first.

When the mobile device enters the user's home 373 a fifth location determination mode may be used (step 781 of FIG. 11). The entry into the user's home may be detected by either detecting a WiFi 'home' signal if WiFi is available, or by detecting that the mobile device is close (e.g., 100 feet) to the home address when using a GPS system due to WiFi unavailability. While in the user's home 373, as shown by step 783 of FIG. 11 when the mobile device has not been dwelling in the home 373 for a long period of time (e.g., less than 20 minutes), the mobile device may attempt to determine its current location using WiFi, if available. If WiFi is available, the GPS application on the mobile device may be turned OFF. If WiFi is unavailable in the user's home 373, then the mobile device may then turn the GPS application ON and attempt to determine its current location using GPS location information obtained from a GPS system. While located within the user's home 373, a slower GPS polling rate, such as in a range of from every 5 minutes to every 10 minutes, may be used to lessen the amount of battery drain on the mobile device, since it is likely that the user will stay at the user's home 373 for at least some amount of time, and thus a faster GPS polling rate as when used in the region 363 is not necessary. If at any time WiFi becomes available when the mobile device is within the user's home 373, the GPS application on the mobile device may be turned OFF. If WiFi is determined to be unavailable after the mobile device has been in the user's home 373 for over a predetermined amount of time, such as for over 15 to 20 minutes, the GPS polling rate may be changed to a slow rate, such as a polling rate of every 15 to 20 minutes, to result in a very low power drain on the mobile device due to the mobile device likely to stay in the user's home 373 for some additional amount of time.

After the mobile device has entered the user's home 373 and has been there for more than a predetermined amount of time, such as for more than 20 minutes, the mobile device may switch from the entry mode of operation to the dwelling mode of operation (Y in step 782 of FIG. 11). In the dwelling mode of operation, if the mobile device is determined to have stayed within the user's home 373 for more than a predetermined amount of time, such as for more than 20 minutes, the mobile device and thus the user presumably carrying the mobile device is presumed to be "dwelling" at the user's home 373, and a dwelling event or notification may be triggered. This dwelling event may cause, for example, the lights to turn on in the user's home 373 and/or the television set in the living room of the user's home 373 to turn on in some embodiments. In other embodiments, the dwelling event may result in output of a message to the user on the user's mobile device regarding whether or not the user wants those actions to occur, thereby requiring an affirmative action by the user to cause those actions to occur. While in the dwelling mode of operation, as shown by step 784 of FIG. 11, the mobile device may attempt to determine its current location using WiFi, if available. If WiFi is available, the GPS application on the mobile device may be turned OFF. If WiFi is unavailable in the user's home 373, then the mobile device may then turn the GPS application ON and attempt to determine its current location using GPS location information obtained from a GPS system, but with a fairly slow polling rate, such as a polling rate in the range of once every 15 to 20 minutes. This slow update rate is used since the mobile device and thus the user is assumed to be "dwelling" at the user's home 373, and is likely not to leave the user's home 373 any time soon.

When the mobile device is detected to be leaving the user's home 373, the mobile device switches from the dwelling mode of operation (or the entry mode of operation if the user has not stayed at the user's home 373 for a long period of time) to the departure mode of operation. The detection of the mobile device leaving the user's home 373 may be a result of the mobile device no longer receiving a WiFi 'home' signal if WiFi is available at the user's home 373, or by detecting that the mobile device is at least a certain distance (e.g., 100 feet) from the home address when using a GPS system for location determination when WiFi is unavailable. When in the region 363, the second location determination mode may be used (Y in step 778 of FIG. 11 and step 730 of FIG. 7). With reference to step 785 of FIG. 11, the mobile device may attempt to determine its current location using WiFi, if available. If WiFi is available, the GPS application on the mobile device may be turned OFF. If WiFi is unavailable when in the inner region 363, then the mobile device may turn the GPS application ON and attempt to determine its current location using GPS location information obtained from a GPS system, with a fast polling rate, such as an polling rate in the range of once every 5 to 10 seconds.

When the mobile device is detected to have crossed from inside to outside the inner geofence 357, then a departure event or notification may be triggered. This departure event may cause, for example, the lights to turn off in the user's home 373 and/or the television set in the living room to turn off (if not already off).

After the mobile device has crossed from inside to outside the inner geofence 357, the third location determination may be used (Y in step 775 of FIG. 11, and step 740 of FIG. 7). With reference to step 786 of FIG. 11, the mobile device may attempt to determine its current location using WiFi, if available. If WiFi is available, the GPS application on the mobile device may be turned OFF. If WiFi is unavailable, then the mobile device may then turn the GPS application ON and attempt to determine its current location using GPS location information obtained from a GPS system, with a fast polling rate, such as a polling rate in the range of once every 5 to 10 seconds. In some embodiments, the fast polling rate may be maintained for up to a predetermined amount of time (e.g., 1 to 2 minutes), and then the GPS application may be turned OFF if the mobile device is determined to have not crossed from outside to inside the inner geofence 357 during that predetermined amount of time. If the mobile device is determined to have crossed from outside to inside the inner geofence 357 and back into the region 363, then the mobile device enters the "entry mode of operation" as described above. If WiFi is unavailable and the mobile device is determined to have stayed in the region 363 for a time period between a first predetermined amount of time and a second predetermined amount of time, such as for an amount of time between 5 minutes and 2 hours, the obtaining of GPS data may be changed from a fast polling rate of every 5 to 10 seconds to a slow polling rate of every 10 to 15 minutes. This due to the likelihood that the mobile device may dwell in the inner region 363 for a fairly long period of time, and thus a faster GPS polling rate that would cause a high drain on the mobile phone's battery would typically not provide any measurable benefit due to the likely lack of significant movement of the mobile device. Similarly, if WiFi is unavailable and the mobile device is determined to have stayed in the inner region 363 for a long time period, such as for an amount of time longer than 8 hours, GPS may be turned OFF or the obtaining of GPS data may be performed at a very slow polling rate, such as a polling rate of once every 45 minutes to once every hour.

After the mobile device has crossed from inside to outside the middle geofence 359 to enter region 367, and thus is in the departure mode, the second location determination may be used (Y in step 772 of FIG. 11, and step 750 of FIG. 7). With reference to step 787 of FIG. 11, the mobile device performs the same location determination procedures as described above with respect to step 774 when the mobile device was in the entry mode while in region 367.

As described above, based on where the mobile device is currently located with respect to the geofence environment 355 (e.g., within the home as in step 722 of FIG. 7, within the inner geofence but not in the home as in step 725 of FIG. 7, etc.), the GPS update rate may be optimized to provide location determination suitable for that region, while at the same time saving on battery drain of the mobile device. For example, when the mobile device is located fairly far away from the user's home 373 and thus precise location determination of the mobile device is not that important, GPS may be turned OFF or GPS may be turned ON with a very slow polling rate (e.g., once every 10 to 20 minutes), to lessen the amount of drain on the mobile device's battery caused by the GPS taking a lot of power when operational. Similarly, when the mobile device is a moderate distance from the user's home 373, such as within the outer geofence 361 but outside the middle geofence 359, GPS may be turned OFF if WiFi is available to save on battery drain of the mobile device, or if WiFi is unavailable, the GPS polling rate may be performed at a moderate rate that is faster than the rate used when the mobile device is located farther away from the user's home 373. Further, when the mobile device is located very close to the user's home 373, such as within the middle geofence 359 or within the inner geofence 357 but not yet at the user's home 373, GPS may be turned OFF if WiFi is available to save on battery drain of the mobile device, or if WiFi is unavailable, the obtaining of GPS data may be performed at a fast polling rate that is faster than the moderate polling rate used when the mobile device is located a moderate distance from the user's home 373, since quickly detecting when the mobile device crosses inside the inner geofence 357 and thus the causing of a notification of triggering event to occur quickly after that detection takes precedence over battery drain of the mobile device.

In some embodiments, based on where the mobile device is currently located with respect to the geofence environment 355 (e.g., outside the outer geofence 361, between the outer geofence 361 and the middle geofence 359, or inside the middle geofence 359 but outside the inner geofence 357), a combination of different location determination modes may be used, such as using GPS and WiFi when in the region between the inner and middle geofences, to provide an appropriate location determination mode to use for the mobile device based on whether it is fairly far from the user's home 373, a moderate distance away from the user's home 373, or fairly close to the user's home 373, while at the same time providing optimization with respect to resultant battery drain of the mobile device when at those locations.

In some embodiments, based on user inputted data and/or information obtained from recent travels by the user with respect to the user's home 373, the user may be determined to be walking to or from the user's home 373, biking to or from the user's home 373, or driving to or from the user's home 373, and the radiuses of the outer geofence 361, the middle geofence 359, and the inner geofence 357 may be optimized accordingly based on the typical speeds associated with those different modes of travel. By way of example, if the user typically rides a bicycle to and from work on a Tuesday, then the 'expectation of speed' value in equation (3) may be set to 15 miles per hour, and if the user typically walks to work on a Thursday, the 'expectation of speed' value in equation (3) may be set to 5 miles per hour.

Also, in some embodiments, the 5 mile value used in equation (4) above may be changed based on the expected mode of travel for the user on a particular day of the week, whereby the 5 mile value may be lowered to 2 miles when the user is biking to the user's home 373, or to 0.5 miles when the user is walking to the user's home 373. In some embodiments, based on the rate of speed of travel of the user in either the entry mode of operation of the departure mode of operation, the distances of the inner geofence 357, the middle geofence 359 and the outer geofence 361 may be changed based on that information. For example, if the speed of travel of the user is determined to be between 10 to 15 miles per hour, which makes it like that the user is using a bicycle, then the outer geofence 361 may be moved to 10 miles away from the middle geofence 359 instead of using the 5 miles value in equation (4) above, and whereby the 'expectation of speed' value used in equation (3) above to determine the distance of the middle geofence 359 with respect to the inner geofence 357 would be the 'calculated speed' value of, say, 12 miles per hour.

Also, if the speed of travel of the user is determined to be between 5 to 6 miles per hour, which makes it likely that the user is walking to and from the user's home 373, then the outer geofence 361 may be moved to 20 miles away from the middle geofence 359 instead of using the 5 miles value in equation (4) above, and whereby the 'expectation of speed' value used in equation (3) above to determine the distance of the middle geofence 359 with respect to the inner geofence 357 would be the 'calculated speed' value of, say, 5 miles per hour.

In some aspects, with reference to FIG. 3B, FIG. 6 and FIG. 10, the computing device may track the amount of time that a user has been at a particular location (see, for example, step 1010 of FIG. 10). For example, the primary user may be a father, and one of the secondary users may be his son. The father may set up his profile to keep track of the amount of time his son has spent at a particular location, such as the living room in front of the television or a gaming console. The father may be periodically notified of the amount of time his son spends in front of the TV or notified when the son spends more than a predetermined amount of time within the geofence region 365 or within the geofence region 367 as shown in FIG. 3B.

In some embodiments, the notifications sent to the user's mobile device when the user crosses either inside or outside the inner geofence 357, the middle geofence 359 and the outer geofence 361 during a first two or three weeks of use of the geofence system may not be sent to the user's mobile device if the user has consistently approved an action based on a notification. For example, if each time during a past two week period the user has accepted a turning on of a heating system in the user's home 373 due to a notification sent to the user when the user has crossed inside the middle geofence 359 and into the geofence region 365, the geofence system may automatically turn on the heating system in the user's home 373 for all future times the user crosses inside the middle geofence 359 and into the geofence region 365. The user may provide a setting via the UI 980 of FIG. 9B to allow such automated actions to occur or not occur in some embodiments (such that an affirmative user action to a notification sent to the user is required to cause an action such as turning on the heating system in the user's home 373).

In some embodiments, based on the user's historic behavior over a predetermined period of time in the recent past, such as the last 3 weeks, location determination modes in the various geofence regions may be modified based on the user's historic behavior. For example, if the user crosses inside the middle geofence 359 at a certain time of the day but does not cross inside the inner geofence 357 until much later after (e.g., 3 hours later), and if the user does this action for three consecutive Fridays, then the user's historic behavior is that the user does not typically go straight to the user's home 373 after crossing inside the middle geofence 359, but rather does something else, such as going to a nearby friend's house for a few hours before then going to the user's home 373. Based on the user's historic behavior, for succeeding Fridays, the geofence system may modify the GPS polling rate to every 2 to 3 minutes if WiFi is unavailable from the 'default' GPS polling rate of every 5 to 8 seconds, since it is unlikely that the user is going straight to the user's home 373 based on the user's past behavior. As such, it is not necessary to quickly detect that the user has crossed the inner geofence 357 (which would cause a notification and/or triggering event to occur), since the user is unlikely to be going straight to user's home 373, and thus power drain on the battery of the user's mobile phone may be lessened by using a slower GPS polling rate based on the user's historic behavior when the user has crossed inside the middle geofence 359. As another example, if a user goes back and forth from inside the user's home 373 to just outside the user's home 373 and into the region 363 several times in a short time period (e.g., three times or more in time frame of two hours or less), these entry/exit events may not result in a notification being output to the user each time this occurs. This may happen when the user is cooking on a grill on a deck outside the user's home 373, for example. In this scenario, based on the recent logged activity of the user with respect to movement in and out of the user's home 373, the region 363 just outside the user's home 373 may be considered part of the user's home 373 in this instance, in which a notification is not pushed to the user's mobile device in these instances (but if the user passes to outside the inner geofence 357, a notification to the user and/or trigger event may result).

The various features described above are merely non-limiting examples, and can be rearranged, combined, subdivided, omitted, and/or altered in any desired manner. For example, features of the computing device (including the remote control device and the terminal device) described herein can be subdivided among multiple processors and computing devices. The true scope of this patent should only be defined by the claims that follow.

The invention claimed is:

1. A method comprising:
   determining a user-specified geofence environment that comprises a target region and a first geofence surrounding the target region;
   storing information indicating a plurality of polling rates comprising:
   a first polling rate associated with locations outside the first geofence,
   a second polling rate associated with locations inside the first geofence but outside the target region, and
   a third polling rate for locations inside the target region;
   determining, based on the information and a current location of a mobile device, a polling rate from the plurality of polling rates; and
   using the determined polling rate to determine a next location of the mobile device.

2. The method of claim 1, wherein:
   the first polling rate is lower than the second polling rate;
   the second polling rate is greater than the first polling rate and the third polling rate; and
   the third polling rate is lower than the second polling rate.

3. The method of claim 1, further comprising determining a power consumption rate of the mobile device, for use in determining the next location of the mobile device, that is based on the information.

4. The method of claim 1, wherein the information indicates:
   a first power consumption rate associated with locations outside the first geofence;
   a second power consumption rate, higher than the first power consumption rate, associated with locations inside the first geofence but outside the target region; and
   a third power consumption rate associated with locations inside the target region.

5. The method of claim 1, wherein the determined polling rate is also determined based on a time spent at the current location.

6. The method of claim 1, further comprising decreasing the determined polling rate as a time spent at the current location increases.

7. The method of claim 1, wherein the first geofence comprises a non-circular boundary.

8. The method of claim 1 further comprising determining a location determination mode, available to the mobile device, for determining the current location of the mobile device.

9. The method of claim 1, further comprising determining the current location of the mobile device via one or more of:
a global positioning system (GPS) location determination mode,
a wireless fidelity (WiFi) location determination mode, or
a cell tower location determination mode.

10. The method of claim 1, further comprising determining the plurality of polling rates based on a movement pattern of the mobile device.

11. The method of claim 1, wherein the information further indicates:
a first home automation operation associated with locations outside the first geofence,
a second home automation operation associated with locations inside the first geofence but outside the target region, or
a third home automation operation associated with locations inside the target region.

12. The method of claim 11, wherein the information further indicates a home automation operation that comprises one or more of the following:
an operation for a set-top-box (STB),
an operation for a home security system,
an operation for a television,
an operation for a thermostat,
an operation for a light, or
an operation for a door of a home.

13. A method comprising:
determining a user-specified geofence environment that comprises a target region and a first geofence surrounding the target region;
storing information indicating a plurality of power consumption rates comprising:
a first power consumption rate associated with locations outside the first geofence,
a second power consumption rate associated with locations inside the first geofence but outside the target region, and
a third power consumption rate associated with locations inside the target region;
determining, based on the information and a current location of a mobile device, a power consumption rate from the plurality of power consumption rates; and
using the power consumption rate to determine a next location of the mobile device.

14. The method of claim 13, wherein:
the first power consumption rate is lower than the second power consumption rate;
the second power consumption rate is higher than the first power consumption rate and the third power consumption rate; and
the third power consumption rate is lower than the second power consumption rate.

15. The method of claim 13, further comprising using a polling rate, based on the current location, to determine the next location of the mobile device.

16. The method of claim 13, wherein the determining the power consumption rate from the plurality of power consumption rates is further based on a dwell time in the current location.

17. The method of claim 13, wherein the determining the power consumption rate from the plurality of power consumption rates comprises:
selecting, based on the information and the current location, a power consumption rate from the plurality of power consumption rates; and
adjusting, based on a dwell time in the current location, the power consumption rate.

18. A method comprising:
determining, based on determining a current location of a mobile device, a user-specified first geofence that surrounds the current location;
storing information indicating:
a first polling rate associated with locations inside the user-specified first geofence; and
one or more second polling rates associated with locations outside of the user-specified first geofence; and
selecting, based on the information and the current location, the first polling rate or one of the one or more second polling rates to determine a next location of the mobile device.

19. The method of claim 18, further comprising:
determining, based on the determining the current location of the mobile device, a second geofence that surrounds the user-specified first geofence and an intermediate region outside the user-specified first geofence but inside the second geofence;
wherein the one or more second polling rates comprises an intermediate second polling rate associated with the intermediate region and an outer second polling rate associated with a region outside the second geofence; and
wherein the selecting comprises:
selecting, based on the information and the current location, the first polling rate, the intermediate second polling rate, or the outer second polling rate to determine the next location of the mobile device.

20. The method of claim 18, further comprising adjusting, based on a dwell time in the current location, the selected polling rate to determine the next location of the mobile device.

21. A non-transitory computer readable medium storing instructions that, when executed, cause:
determining a user-specified geofence environment that comprises a target region and a first geofence surrounding the target region;
storing information indicating a plurality of polling rates comprising:
a first polling rate associated with locations outside the first geofence,
a second polling rate associated with locations inside the first geofence but outside the target region, and
a third polling rate for locations inside the target region;
determining, based on the information and a current location of a mobile device, a polling rate from the plurality of polling rates; and
using the determined polling rate to determine a next location of the mobile device.

22. The non-transitory computer readable medium of claim 21, wherein:
the first polling rate is lower than the second polling rate;
the second polling rate is greater than the first polling rate and the third polling rate; and
the third polling rate is lower than the second polling rate.

23. The non-transitory computer readable medium of claim 21, wherein the instructions, when executed, further cause determining a power consumption rate of the mobile device, for use in determining the next location of the mobile device, that is based on the information.

24. The non-transitory computer readable medium of claim 21, wherein the information indicates:
a first power consumption rate associated with locations outside the first geofence;
a second power consumption rate, higher than the first power consumption rate, associated with locations inside the first geofence but outside the target region; and
a third power consumption rate associated with locations inside the target region.

25. The non-transitory computer readable medium of claim 21, wherein the determined polling rate is also determined based on a time spent at the current location.

26. The non-transitory computer readable medium of claim 21, wherein the instructions, when executed, further cause decreasing the determined polling rate as a time spent at the current location increases.

27. The non-transitory computer readable medium of claim 21, wherein the first geofence comprises a non-circular boundary.

28. The non-transitory computer readable medium of claim 21 wherein the instructions, when executed, further cause determining a location determination mode, available to the mobile device, for determining the current location of the mobile device.

29. The non-transitory computer readable medium of claim 21, wherein the instructions, when executed, further cause determining the current location of the mobile device via one or more of:
a global positioning system (GPS) location determination mode,
a wireless fidelity (WiFi) location determination mode, or
a cell tower location determination mode.

30. The non-transitory computer readable medium of claim 21, wherein the instructions, when executed, further cause determining the plurality of polling rates based on a movement pattern of the mobile device.

31. The non-transitory computer readable medium of claim 21, wherein the information further indicates:
a first home automation operation associated with locations outside the first geofence,
a second home automation operation associated with locations inside the first geofence but outside the target region, or
a third home automation operation associated with locations inside the target region.

32. The non-transitory computer readable medium of claim 31, wherein the information further indicates a home automation operation that comprises one or more of the following:
an operation for a set-top-box (STB),
an operation for a home security system,
an operation for a television,
an operation for a thermostat,
an operation for a light, or
an operation for a door of a home.

33. A system comprising:
a mobile device; and
a computing device;
wherein the mobile device comprises:
one or more first processors; and
first memory storing first instructions that, when executed by the one or more first processors, cause the mobile device to:
determine a user-specified geofence environment that comprises a target region and a first geofence surrounding the target region;
store information indicating a plurality of polling rates comprising:
a first polling rate associated with locations outside the first geofence,
a second polling rate associated with locations inside the first geofence but outside the target region, and
a third polling rate for locations inside the target region;
determine, based on the information and a current location of the mobile device, a polling rate from the plurality of polling rates; and
use the determined polling rate to determine a next location of the mobile device; and
wherein the computing device comprises:
one or more second processors; and
second memory storing second instructions that, when executed by the one or more second processors, cause the second computing device to:
receive, from the mobile device, a polling signal at the determined polling rate.

34. The system of claim 33, wherein:
the first polling rate is lower than the second polling rate;
the second polling rate is greater than the first polling rate and the third polling rate; and
the third polling rate is lower than the second polling rate.

35. The system of claim 33, wherein the first instructions, when executed by the one or more first processors, further cause the mobile device to determine a power consumption rate of the mobile device, for use in determining the next location of the mobile device, that is based on the information.

36. The system of claim 33, wherein the information indicates:
a first power consumption rate associated with locations outside the first geofence;
a second power consumption rate, higher than the first power consumption rate, associated with locations inside the first geofence but outside the target region; and
a third power consumption rate associated with locations inside the target region.

37. The system of claim 33, wherein the determined polling rate is also determined based on a time spent at the current location.

38. The system of claim 33, wherein the first instructions, when executed by the one or more first processors, further cause the mobile device to decrease the determined polling rate as a time spent at the current location increases.

39. The system of claim 33, wherein the first geofence comprises a non-circular boundary.

40. The system of claim 33 wherein the first instructions, when executed by the one or more first processors, further cause the mobile device to determine a location determination mode, available to the mobile device, for determining the current location of the mobile device.

41. The system of claim 33, wherein the first instructions, when executed by the one or more first processors, further cause the mobile device to determine the current location of the mobile device via one or more of:
a global positioning system (GPS) location determination mode,
a wireless fidelity (WiFi) location determination mode, or
a cell tower location determination mode.

42. The system of claim 33, wherein the first instructions, when executed by the one or more first processors, further cause the mobile device to determine the plurality of polling rates based on a movement pattern of the mobile device.

43. The system of claim 33, wherein the information further indicates:
- a first home automation operation associated with locations outside the first geofence,
- a second home automation operation associated with locations inside the first geofence but outside the target region, or
- a third home automation operation associated with locations inside the target region.

44. The system of claim 43, wherein the information further indicates a home automation operation that comprises one or more of the following:
- an operation for a set-top-box (STB),
- an operation for a home security system,
- an operation for a television,
- an operation for a thermostat,
- an operation for a light, or
- an operation for a door of a home.

\* \* \* \* \*

UNITED STATES PATENT AND TRADEMARK OFFICE
CERTIFICATE OF CORRECTION

PATENT NO. : 11,696,089 B2  
APPLICATION NO. : 17/871190  
DATED : July 4, 2023  
INVENTOR(S) : Zhen Zhao Page 1 of 1

It is certified that error appears in the above-identified patent and that said Letters Patent is hereby corrected as shown below:

In the Specification

Detailed Description, Column 8, Line 40:
After the first "the location", delete "the location"

Detailed Description, Column 8, Line 41:
Please delete "stationary se." and insert --stationary sites.--

Detailed Description, Column 19, Line 49:
After "up)", insert --.--

Signed and Sealed this  
Twenty-fifth Day of February, 2025

Coke Morgan Stewart  
*Acting Director of the United States Patent and Trademark Office*